(12) United States Patent
Morrison et al.

(10) Patent No.: US 8,260,900 B2
(45) Date of Patent: Sep. 4, 2012

(54) NETWORK OPERATION MANAGEMENT

(75) Inventors: Patrick S. Morrison, Marietta, GA (US); Daniel C. Edwards, Duluth, GA (US); Kurt D. Huber, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 151 days.

(21) Appl. No.: 12/400,516

(22) Filed: Mar. 9, 2009

(65) Prior Publication Data
US 2010/0228854 A1 Sep. 9, 2010

(51) Int. Cl.
*G06F 15/173* (2006.01)
(52) U.S. Cl. ........................................ 709/223
(58) Field of Classification Search .................. 709/223
See application file for complete search history.

(56) References Cited

U.S. PATENT DOCUMENTS

| | | | |
|---|---|---|---|
| 7,401,338 B1* | 7/2008 | Bowen et al. ............... | 719/328 |
| 7,523,191 B1* | 4/2009 | Thomas et al. .............. | 709/224 |
| 7,600,160 B1* | 10/2009 | Lovy et al. ................. | 714/57 |
| 7,685,261 B1* | 3/2010 | Marinelli et al. ........... | 709/220 |
| 7,774,444 B1* | 8/2010 | George et al. .............. | 709/223 |
| 2002/0002593 A1* | 1/2002 | Ewing et al. ............... | 709/212 |
| 2003/0084200 A1* | 5/2003 | Buehler et al. ............. | 709/318 |
| 2006/0040711 A1* | 2/2006 | Whistler .................... | 455/566 |
| 2006/0091999 A1* | 5/2006 | Howarth .................... | 340/10.3 |
| 2010/0217837 A1* | 8/2010 | Ansari et al. ............... | 709/218 |

* cited by examiner

*Primary Examiner* — Boris Gorney
(74) *Attorney, Agent, or Firm* — Turocy & Watson, LLP

(57) ABSTRACT

Systems and methods are provided to monitor and control peripheral devices at a remote operational site. A management platform configures a site controller deployed at the operational site, wherein configuration specifies collection of data from the peripheral devices connected to the site controller. Conditions that monitor device status and specify device alarms triggers also can be configured. Commands, which can be part of a script, remotely control peripheral devices functionally coupled to the site controller. Collected data is conveyed through a wired or wireless link to management component, which stores the data for analysis and report generation, and can supply the data to an authorized terminal. Data and reports can be conveyed to one or more systems and mass storage functionally connected to the management component. Analysis includes data trend generation. Reports include features of observed and predicted data, and alarm summaries.

19 Claims, 16 Drawing Sheets

NETWORK OPERATION MANAGEMENT

TECHNICAL FIELD

The subject innovation relates to service-based networks and, more particularly, to end-to-end monitoring and control of equipment deployed in a remote location that is part of a mobile network.

BACKGROUND

Service-based networks typically include a centralized provider site and remotely located operational sites that render at least a part of specific service such as exchange of wireless content and signaling. As service-based networks increasingly rely on remote cell site deployment, implementation of remote monitoring and control of cell site(s) also has increased. Yet, functional and operational disparities among devices or equipment that comprise a remote location cell site typically have resulted in dedicated equipment-specific solutions for remote monitoring or control capability(ies). A centralized provider site can optionally include management components (e.g., terminal computers) for remote control of specific equipment. Such management components generally rely on dedicated communication links to respective devices at remotely located operational sites, and implement management operations through a dedicated interface and software application(s) at the management component.

Network support sites can have various degrees of complexity. Depending on network type, e.g., mobile telecommunication network, one or more devices comprise each remotely located operational site. In particular, in cellular mobile networks, a network remotely located site can be embodied in a cell site which can include equipment with substantially disparate functionality and operational and maintenance requirements; for instance, a cell site can provide telecommunication signals according to various technology protocols and operate disparate ensuing equipment. Thus, conventional management of complex network sites readily becomes cumbersome and cost ineffective in view of the various device-specific interfaces and applications, and communication links.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

System(s) and method(s) are provided to monitor and control addressable peripheral devices at a remote operational site or remote location. A management platform configures a site controller deployed at the operational site or remote location. Configuration can specify features of data collection, e.g., device polling rate, from the addressable peripheral devices connected to the site controller. It is noted that polling rate also can be utilized, e.g., through a predetermined value (e.g., logic or numeric), to specify streaming collection or near-realtime data collection. Additionally, configuration can establish conditions that monitor device status and specify device alarm triggers and recipient(s) of alarm indication(s). Moreover, the management platform can deliver software or firmware applications, and scheduled or even-based updates thereof, that allow at least in part operation of the addressable devices. The management platform also can convey directives or commands to the site controller in order to manipulate peripheral device(s) associated therewith. Directives or commands can be part of a script and can be conveyed through execution thereof effected by the management platform. Scripts can be specified through the management platform. Site controller collects data in accordance with received configuration, and conveys such data through a wired, e.g., a DS0 line or an Ethernet line, or wireless link to the management platform, which stores the data for analysis and report generation. Collected data also can be retained at the site controller. Site controller also can monitor alarm conditions as configured through management platform and convey alarm indications or warnings thereto when a condition that triggers an alarm is fulfilled. In an aspect, an alarm condition can be defined as a simple network management protocol (SNMP) trap.

In an aspect, terminals authorized to access the management platform provide configuration contents, wherein access authorization can be implemented in accordance with various secure network access protocols. Terminals also can receive raw operational data, and analyzed data and reports thereof from management platform for evaluation and decision-making purposes. Analysis includes data modeling or forecast and historical trends extraction. Reports include features of observed and predicted data, and alarm summaries. Data and reports, as well as any information gathered through site controller and retained at the management platform, can be conveyed to one or more systems, e.g., backend systems, and data storage elements functionally connected to the management platform, or related to a network that hosts the management platform.

In another aspect, management platform can be embodied in a computer server, and site controller is a rack-mountable unit that has various connections, or ports, which allow functional coupling to the addressable peripheral devices that perform at the operational site or remote location. Connection or ports can include, but are not limited to, parallel ports (e.g., General Purpose Interface Bus (GPIB), IEEE-1284), serial ports (e.g., Recommended Standard (RS)-232, V.11, Universal Serial Bus (USB), FireWire or IEEE-1394 . . . ), Ethernet ports, V.35 ports, X.21 ports, or dry contacts. In another aspect, terminals can be substantially any computing device, mobile or otherwise, that affords connectivity to a network communicatively linked to the management platform.

At least one advantage of systems and methods described herein is the afforded complete end-to-end network management in which a single management platform that provides administration and control is interfaced with a single controller at a remote operational site. The controller implements monitoring and of a set of peripheral devices associated with the remote location, and effects remotely received directives that control the peripheral devices.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
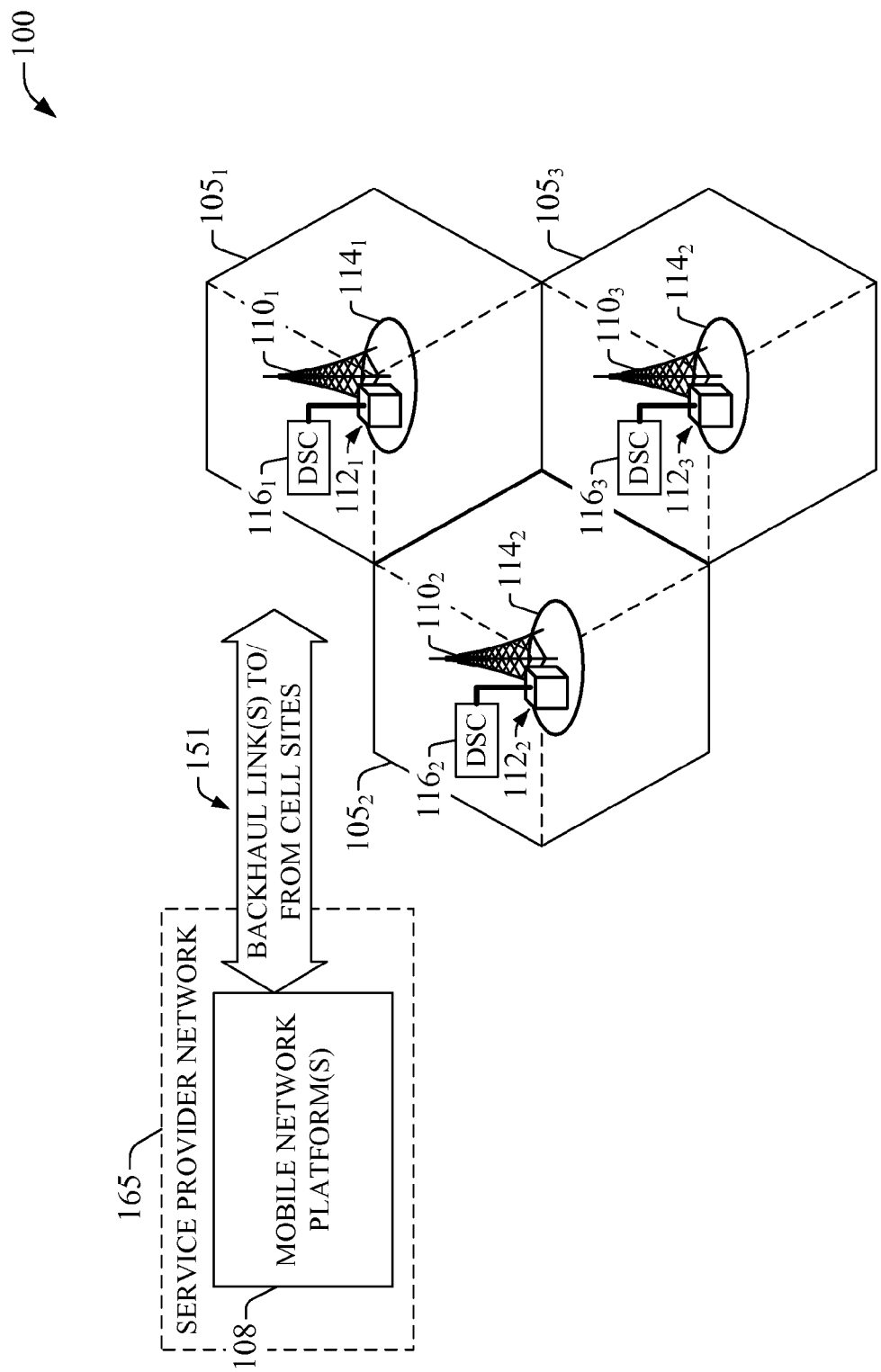
FIG. 1 is an illustrative wireless network environment that can operate in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present innovation. It may be evident, however, that the present innovation may be practiced without these specific details. In other instances, well-known structures and devices are shown in block diagram form in order to facilitate describing the present invention.

As used in this application, the terms "component," "system," "platform," "engine," "interface," and the like are intended to refer to a computer-related entity or an entity related to an operational apparatus with one or more specific functionalities, wherein the entity can be either hardware, a combination of hardware and software, software, or software in execution. As an example, a component or alike entity may be, but is not limited to being, a process running on a processor, a processor, an object retained in memory, an executable retained in memory, a thread of execution, a program retained in memory, and/or a computer. By way of illustration, both an application running on a server and the server can be a component or like entity as referred to herein. One or more components or like entities may reside within a process and/or thread of execution and a component may be localized on one computer and/or distributed between two or more computers. In addition, these components or like entities can execute from various computer readable media having various data structures and code instructions stored thereon. The components or like entities may communicate via local and/or remote processes such as in accordance with a signal having one or more data packets (e.g., data from one component interacting with another component in a local system, distributed system, and/or across a network such as the Internet with other systems via the signal). As another example, a component or an alike entity as referred to herein can be an apparatus with specific functionality provided by mechanical parts operated by electric or electronic circuitry which is operated by a software or firmware application executed by a processor, wherein the processor can be internal or external to the apparatus and executes at least a part of the software or firmware application. Yet another example, a component or a like entity as herein referred to can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "access terminal," "terminal,"

"handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based data flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

As described in greater detail below, the subject innovation provides systems and methods to monitor and control addressable peripheral devices at a remote operational site. A management platform configures a site controller deployed at the operational site, wherein configuration specifies data collection features from the addressable peripheral devices connected to the site controller. In addition, the management platform can convey directives or commands to the site controller to manipulate a peripheral device within a sub-system associated with the site controller. Directives or commands can be part of a script and can be conveyed through execution thereof effected by the management platform. Conditions that monitor device status and specify device alarms triggers also can be configured. Alarm configuration allows to determine a recipient for alarm indication. Terminals authorized to access the management platform provide configuration contents. Collected data is conveyed through a wired or wireless link to the management component, which stores the data for analysis and report generation. Data and reports can be conveyed to one or more systems and data storage elements functionally connected to the management component. Analysis includes data forecast and historical trends extraction. Reports include features of observed and predicted data, and alarm summaries.

With reference to the drawings, FIG. 1 is a schematic wireless network environment 100 that can operate in accordance with aspects described herein. Illustrative wireless network environment 100 includes a set of three macro cells $105_1$-$105_3$. It is noted, however, that deployments of coverage macro cells in typical cellular wireless networks range from $10^3$-$10^5$ macro cells. It should be appreciated that coverage macro cells $105_\mu$ ($\mu$=1,2,3) are illustrated as hexagons; however, coverage cells can adopt other geometries generally dictated by a deployment configuration or floor plan, geographic areas to be covered, and so on. Each macro cell $105_\mu$ is sectorized in a $\pi/3$ configuration in which each macro cells includes three sectors, demarcated with dashed lines in FIG. 1. Other sectorizations are possible, and aspects or features of the subject innovation can be exploited regardless of type of sectorization.

Each macro cell $105_\mu$ ($\mu$=1,2,3) has a cell site $114_\mu$ associated therewith. A cell site comprises a portion of real estate, a base station tower $110_\mu$ that typically supports antenna(s) for telecommunication (e.g., radio frequency (RF), microwave, and/or satellite dish antennas), and additional sub-system $112_\mu$ that include devices that provide, at least in part, wireless coverage and operation of cell site. As an example, a sub-system $112_\mu$ in a cell site (e.g., cell $105_1$) can include air conditioning systems, direct current (DC) power systems, battery systems, smoke and intrusion alarm systems, and so forth. Additionally, a sub-system $112_\mu$ includes electronic circuitry or components that afford telecommunication in accordance to one or more radio technologies. In aspect, telecommunication is based at least in part on standardized protocols determined by the radio technology utilized for communication. In addition telecommunication can utilize one or more frequency bands, or carriers, which can include substantially all or all EM frequency bands licensed by the service provider (e.g., personal communication services (PCS), advanced wireless services (AWS), general wireless communications service (GWCS), and so forth), and substantially all or all unlicensed frequency bands currently available for telecommunication (e.g., the 2.4 GHz industrial, medical and scientific (IMS) band or one or more of the 5 GHz set of bands). Electronic circuitry or components within a sub-system $112m$ allow utilization of the various frequency carriers.

Cell sites $114_\mu$ and associated sub-systems $112_\mu$ are operated at least in part via mobile network platform(s) 108, which can be part of a service provider network 165, to provide wireless service. Mobile network platform(s) 108 facilitates circuit switched (CS)-based (e.g., voice and data) and packet-switched (PS) (e.g., internet protocol (IP), frame relay, or asynchronous transfer mode (ATM) . . . ) traffic and signaling generation, and delivery and reception for networked telecommunication in accordance with various radio technologies for disparate markets. Moreover, wireless network platform(s) 108 can control and manage base stations within sub-systems $112_\mu$ in disparate macro cells $105_\mu$ via, for example, a wireless network management component (e.g., radio network controller(s), cellular gateway node(s) . . . ). In cellular wireless technologies (e.g., 3rd Generation Partnership Project (3GPP) Universal Mobile Telecommunication System (UMTS), Global System for Mobile Communication (GSM)), wireless network platform 108 is embodied in a core network and a set of radio network controllers. It is noted that wireless network platform(s) 108 also can integrate disparate mobile networks (e.g., femto network(s), Wi-Fi network(s), femto cell network(s), broadband network(s), service network(s), enterprise network(s) . . . ) in which features or aspects of the subject innovation can be implemented.

In wireless network environment 100, mobile network platform(s) 108 can functionally connect with cell sites through backhaul link(s) 151 to/from cell sites. In an aspect, backhaul link(s) 151 can include wired link components like T1/E1 or T3/E3 phone lines; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation).

In an aspect of the subject innovation, each cell site $114_\mu$ also comprises a dedicated site controller $116_\mu$, also referred herein as site controller $114_\mu$. Site controllers are functionally connected to sub-systems $112_\mu$ and can monitor and control, at least in part, such sub-systems. Each site controller $114_\mu$ is connected to one or more devices in sub-systems $112_\mu$, and exchanges data and control with mobile network platform(s) 108, or a management platform thereof, via backhaul link(s) 151. Alternatively or additionally, dedicated backhaul link(s), wired or wireless, can be deployed to provide communication among a dedicated site controller $116_\mu$ and mobile network platform(s) 108, or one or more component or platforms therein. In another aspect, a management platform, which can reside within mobile network platform(s) 108, operates at least in part each deployed site controller $116_\mu$. Through the management platform, authorized terminals can exploit and manipulate one or more site controllers $116_\mu$. Aspects and features of functionality and related advantages of site controllers 116 and management platform associated therewith are described next in accordance with the subject innovation.

Figure 2:
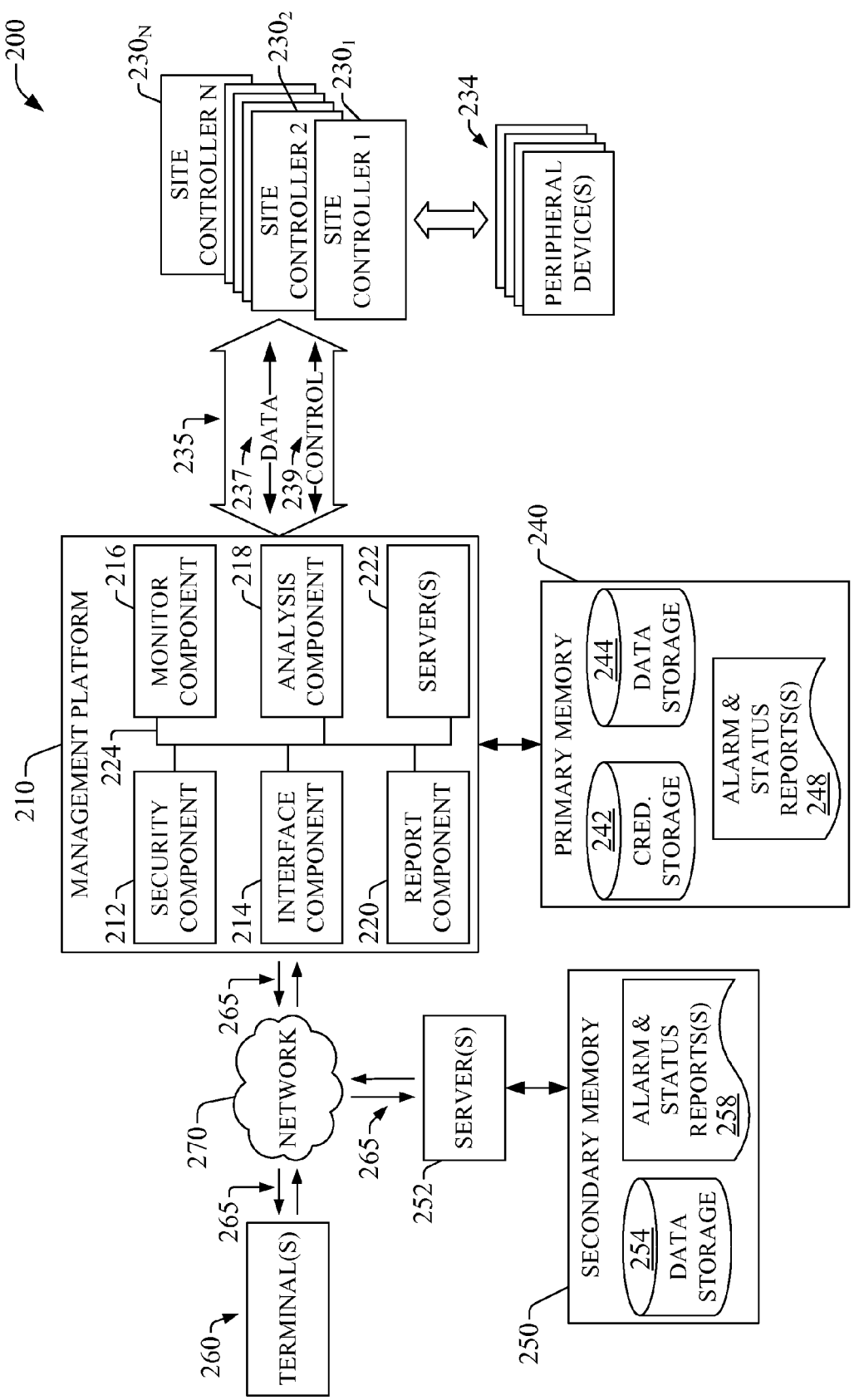
FIG. 2 illustrates a block diagram of an example system that manages, e.g., monitors and controls, any addressable peripheral device at a cell site or remote location in accordance with aspects described herein.

FIG. 2 illustrates a block diagram of an example system 200 that manages, e.g., monitors and controls, any addressable peripheral device at a cell site, or remote location, in accordance with aspects described herein. Example system 200 includes a management platform 210 that exchanges data 237 and control signal(s) 239 with a set of site controllers $230_1$-$230_N$ (with N a natural number ranging, for example, from $10^3$-$10^5$) each deployed in a cell site and functionally connected to respective sets of one or more peripheral device(s) 234. Exchange of data 237 and control signal(s) 239 can be implemented through packet-based communication (e.g., IP, frame relay, or ATM . . . ) or frame-based communication, even though substantially any communication protocol can be utilized to effect the exchange. In an aspect, each set of one or more peripheral device(s) 234 can be grouped into one or more sub-systems (e.g., sub-systems $112_\mu$) that operate in a cell site (e.g., sub-systems $114_\mu$). Each site controller λ $230_\lambda$ (with λ=1,2 . . . N) exchanges at least one of data 237 or control signal(s) 239 with management platform 210 through a respective link 235. Such link 235 can include a wired backbone link such as a DS0 line, an Ethernet line, an optical fiber backbone link, a twisted-pair line, a T1/E1 or T3/E3 phone line, a digital subscriber line, either synchronous or asynchronous, or asymmetric DSL; a coaxial cable; or the like. Alternatively or additionally, link 235 can include a wireless backhaul link, which can be either a line-of-sight (LOS) link (e.g., a satellite link) or a non-LOS link. In an aspect, a site controller $230_\lambda$ can be a rack mountable unit that is installed at the cell site, and has a set of one or more ports or connections that allow for operational coupling to peripheral devices at the cell site and data collection there from in a configurable manner. Ports or connections include, but are not limited to, parallel ports (e.g., General Purpose Interface Bus (GPIB), IEEE-1284), serial ports (e.g., Recommended Standard (RS)-232, V.11, Universal Serial Bus (USB), FireWire or IEEE-1394 . . . ), Ethernet ports, V.35 ports, X.21 ports, or dry contact. Site controllers $230_1$-$230_N$ can collect data from peripheral devices that exploit disparate technology for operation. In the subject innovation, a site controller also is referred to as a dedicated site controller (DSC). Peripheral device(s) 234 can be grouped into sets of sub-systems linked, or connected, to respective site controllers 1 through N.

Exchange of data 237 and control signal(s) 239 can be specified through configuration of data collection features to be effected by a site controller. Data collection features include a configurable set of one or more time intervals at which a peripheral device functionally interfaced to a site controller $230_\lambda$ is probed or polled. It should be noted that a set of time intervals that spans a single interval Δτ leads to periodic data collection. Alternatively or additionally, the peripheral device can be probed or polled at scheduled instants throughout a time cycle (e.g., a day, a week, a month). Data collection features also can include specific instants at which data is exchanged. Thus, data features are illustrated as follows: A rectifier at a cell site can be probed, or checked, every Δτ=15 minutes and each reading or measurement can be retained in a memory until 3:00 am, at which time the DSC functionally connected to the rectifier delivers collected data to a management platform or server, and data collection cycle resumes.

Configuration can be implemented through monitor component 216 with information or content(s) received via terminal(s) 260 that are authorized to access management platform 210. Interface component 214 can provide display user interface(s), either graphical or text-based, that allow entry of configuration content(s). In an aspect, terminal(s) 260 can be embodied in a computing device, mobile or otherwise, which can be at least one of a mobile device, a pseudo-stationary device, a purpose-specific device, or the like. Terminal(s) 260 can request access to, and access upon approval, management platform 210 through network 270, which can be a mobile or non-mobile network, e.g., a broadband network. Wired or wireless link(s) 265 afford communication among terminal(s) 260 and management platform 210. In an aspect, direct access to a site controller, e.g., site controller $230_2$, from terminal(s) 260 via network 270 is not available since site controllers $230_1$-$230_N$ communicate primarily with management platform 210.

Configuration of data collection features can include generation of a status profile that configures a port associated with a peripheral device or sub-system, and specifies a set of conditions that determine data collection features, and status checks related to the configured port, or peripheral device. In an aspect, the set of one or more conditions in a status profile can include at least two groups of conditions: (1) collection or polling conditions and (2) status conditions. Conditions in group (1) can define the various data collection features described herein. For example, polling conditions can specify a rate, e.g., through a numeric parameter, at which data is to be measured; for instance: "Rectifier:Measure{V_onRate}" where "Rectifier" indicates the device that is polled is a rectifier, "Measure" conveys that a measurement is to be conducted and "V_onRate" indicates that voltage is measured at a specific rate Rate In addition, polling conditions can establish that data collection is to be effected in realtime or near realtime; such a determination can be implemented through a limiting numeric variable for the polling rate, e.g., "Rate=$10^{10}$", or via a logic custom variable such as "Streaming.True." With respect to (2), status conditions can be logic or numeric conditions that support status checks by specifying data features that when met reveal a particular status of a device. As an example, a status condition can specify a comparison between a number of times ("P") a heat pump is turned on ("On") and a threshold ("M"), e.g., "P.On.ge.M," which can reveal performance of a HVAC sub-system; P and M natural numbers. As another example, a status condition can enumerate a number of times an RET antenna is configured within a predetermined time cycle (e.g., a day); namely, "Tilt.true then{Ncount++}," where Tilt is a logic variable and Ncount is an integer counter, and "++" indicates addition of a unit to a current value. Such counter can reveal quality of service (QoS) issues during telecommunication via a base station within the cell site that contains the configured DSC. In addition, in group (2), an alarm class can be configured. The alarm class defines at least one of a sub-system to be alarmed, a set of conditions that trigger an alarm, and a mechanism for alarm transport or delivery. In an aspect, an alarm condition in the set of conditions can be defined as an SNMP trap. In an aspect, the mechanism to deliver an alarm can be based at least in part on an organizational position, e.g., manager, engineer, etc., of an agent that request access to the management platform 210. In addition, the mechanism defined in an alarm class can establish the format and content of an alarm indication based at least in part on the intended recipient (e.g., operator or component) of the alarm indication. As an example, the format can include at least one of a set of multi-bit words; a graphical, visual, or audible token that can be conveyed in an end-user display interface; a short message service (SMS) communication; a multimedia message service (MMS) communication; an unstructured supplementary service data (USSD) message; an email message; an instant message; or the like.

Additionally, management platform 210, e.g., through monitor component 216, can deliver software application(s) or firmware application(s) that allow at least in part operation of the addressable devices in accordance with features of configured port(s). The software or firmware application(s) can be at least one of a collection of executable (e.g., compiled and linked) code instructions, compiled code instructions, source code instructions, libraries that support execution of code, templates, classes, or other objects; drivers such as those retained in memory element 829; or contents that at least one of augment, replace, or revise a management information base (MIB) within a SNMP, the MIB associated with management of the DSC and sub-systems thereof; or the like. Software application(s) or firmware application(s) can be updated on a scheduled basis, such as a monthly basis, quarterly basis, semi-annual basis, or yearly basis. In an example, a service provider that operates management platform 210 can implement yearly software application updates that include updates to a library of message information bases (MIBs) that at least enable control of peripheral devices operationally connected to one or more sub-systems functionally connected to a site controller. Management platform also can implement updates of software application(s) or firmware application(s) on an event basis; for instance, if a generator company that provides equipment that operates in remote cell site(s) begins manufacturing a new generator that is remotely accessible, and can operate within a sub-system functionally linked to a site controller, a new library of MIBs can be pushed, or delivered, to the site controller. Other events, such as unscheduled maintenance or response to alarm(s) indication(s) can prompt software application(s) or firmware application(s) updates.

In an aspect, security component 212 can authorize a terminal to access management platform 210 based at least in part on secure network connection protocol(s), which can exploit security credential(s) retained in credential storage 242. Credential(s) can include substantially any code or token, or lightweight file (e.g., digital certificate) that uniquely identifies a terminal or user thereof; for instance, passwords, public and private encryption keys, etc. Security protocols can include at least one of encryption, password protection, or biometric-based access carried-out through recognition of an authorized biometric instrument such as fingerprint(s) or iris pattern, voice profile, or any combination thereof. As an example, security protocols can include Internet Protocol Security (IPsec), Secure Socket Layer (SSL), Transport Layer Security (TLS), Secure Shell (SSH), Secure File Transport Protocol (SFTP), Secure Copy (SCP), and so forth. It is to be noted that security component 305 can exploit one or more of the illustrative security protocols to establish a virtual private network (VPN) for terminal-to-management component tunnel of data and control signal(s). Security protocol(s) can be retained in primary memory 240.

Upon authorization of access to management platform 210, monitor component 216 can configure a monitoring and control environment based at least in part on security credential(s) of a requester and a point of access (e.g., logic address or logic domain of terminal(s) 160) to management platform 210. Monitoring and control environment can include specific functional elements such as a specific set of configuration tools, e.g., scripting libraries such as script modules or classes for specific type of monitoring and control; a set of data modeling tools; predetermined access privileges to site controllers and peripheral devices functionally connected thereto; etc. Additionally, configured monitoring and control environment can provide a display user interface, e.g., a graphical user interface (GUI), compatible with the specific functional elements of the configured monitoring and control environment.

Received operational data 237, measured through one or more peripheral devices, or sub-system, can be retained in memory 240, and analyzed. Analysis component 218 can process stored and received data; analysis on received data can take place in near real-time when one or more of site controllers $230_1$-$230_N$ stream data. Analysis can be directed to at least one of (i) status assessment through evaluation of the set of conditions established in a status profile; (ii) feature extraction of aggregated data; or (iii) trend generation or data modeling. Data that results from analysis of stored operational data also can be retained in memory 240. Report component 220 can summarize findings of analysis related to at least items (i)-(iii). In an aspect, status report(s) can be generated and retained in alarm and status report(s) 248, in memory 240. Report component 220 also can generate report(s) of received alarm indications, e.g., received through control signal(s) 239, in accordance with a configured alarm class; alarm reports can be retained in alarm and status report(s) 248. In addition, report component 220 can convey analysis report(s) and alarm report(s) to an alarm and status report(s) 258 in secondary memory 250. Rich data availability, and intelligence collected there from, that is provided through data gathering, analysis, and reporting, can allow accurate diagnosis of operational problems, which in turn can reduce on-site maintenance events since the operational problems can be resolved remotely trough appropriate control signal(s).

In addition, monitor component 216 can convey received operational data 237 or stored data in data storage 244 to a disparate external server 252, which includes at least one or a processor, a memory, and a bus architecture, or to data storage 254 in secondary memory 250. It should be appreciated that while monitor component 216 can deliver data through network 270, through wired or wireless link 265, data can be conveyed directly to server(s) 252 via, for example, a standardized northbound interface. Likewise, received operational data 237 can be ported, or delivered, to secondary memory 250. It is noted that operational data 237 can be conveyed to additional or alternative server(s), or memories or databases. As an example, server(s) 252 and secondary memory 250 can be a part of a NIS (network information service) system (e.g., Netcool, customer information control system (CICS) transation server (CTS), CSS) that operates in an enterprise local area network (LAN) such as an operation and maintenance (O&M) LAN, or a business development LAN utilized by analysts for cost(s) management and cell deployment development, e.g., decommissioning of legacy telecommunication technologies and transition to advanced technologies. As another example, server(s) 252 can embody a gateway component for a network, mobile or otherwise, coupled to network 270. Yet another example, server(s) 252 and secondary memory 250 can embody an on-the-could storage element that provides access to measured data and analysis thereof to various organizational layers of network 270, such as one or more of business layer(s), O&M layer(s), customer service layer, or research and development (R&D) layer(s). As a further example, data storage 254 can be accessed by providers that service deployed sub-systems, or peripheral device(s) therein, associated with one or more site controller(s).

Monitor component 216 can control remotely one or more peripheral devices in one or more sub-systems associated with a site controller. Control can be effected via a script of directives or commands. Such remote control, in addition to monitoring of the one or more peripheral devices can enable maintenance of high-quality service, e.g., wireless communication, commercial transactions, distance learning, and lower optimization costs associated with the service. As an example, in third generation (3G) telecommunication networks, monitoring and control of RET antennas, or other types of smart antennas, afforded through management platform 210 and associated systems and mass storage or memories, can substantially increase quality of service and thus mitigate customer attrition. As another additional or alternative example, monitoring and control provided through example system 200 also can allow remote spectral analysis and voltage standing wave ratio (VSWR) monitoring in base station equipment, which further promotes high quality of service and ensuing subscriber retention.

Server(s) 222 includes at least one processor, one memory element, and a bus architecture, and can be functionally connected to each component in management platform, and can confer, at least in part, the described functionality of security component 212, interface component 214, report component 216, monitor component 218, and analysis component 220. Server(s) 222 connects to components comprised in management platform through system bus 224. Additionally or alternatively, server(s) 222 can execute one or more of the components included comprised within management platform 210. Moreover, or as another alternative, one or more components that comprise management platform 210 can reside within server(s) 222. Server(s) 222, can execute, e.g., through the at least one processor therein, code instructions stored in a memory, e.g., primary memory 240 or a memory element (not shown) local to the server, to provide at least in part the functionality of the one or more of the components that reside within management platform 210. It is noted that primary memory 240 can be distributed, at least in part, over one or more components or server(s) within management component 210.

At least an advantage of example system 200 is that network management, e.g., remote monitoring and control of a set of cell sites or remote locations, can be conducted in a standardized manner regardless of the underlying telecommunication technology utilized by service provider network, and technology(ies) of non-telecommunication sub-systems that afford operation of a cell site. In an aspect, example system 200 provides a technology agnostic platform for standardization of alarm indication(s) and transport thereof.

Figure 3:
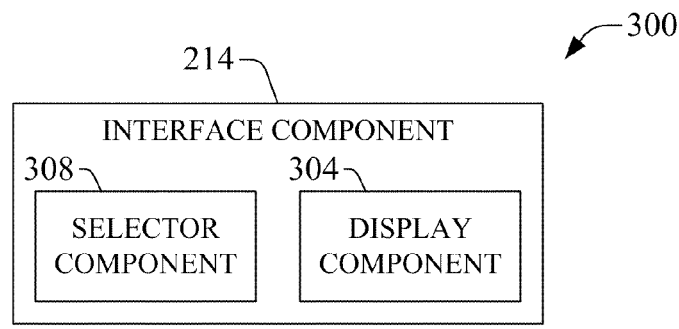
FIG. 3 illustrates an example embodiment of an interface component in accordance with aspects described herein.
Figure 4:
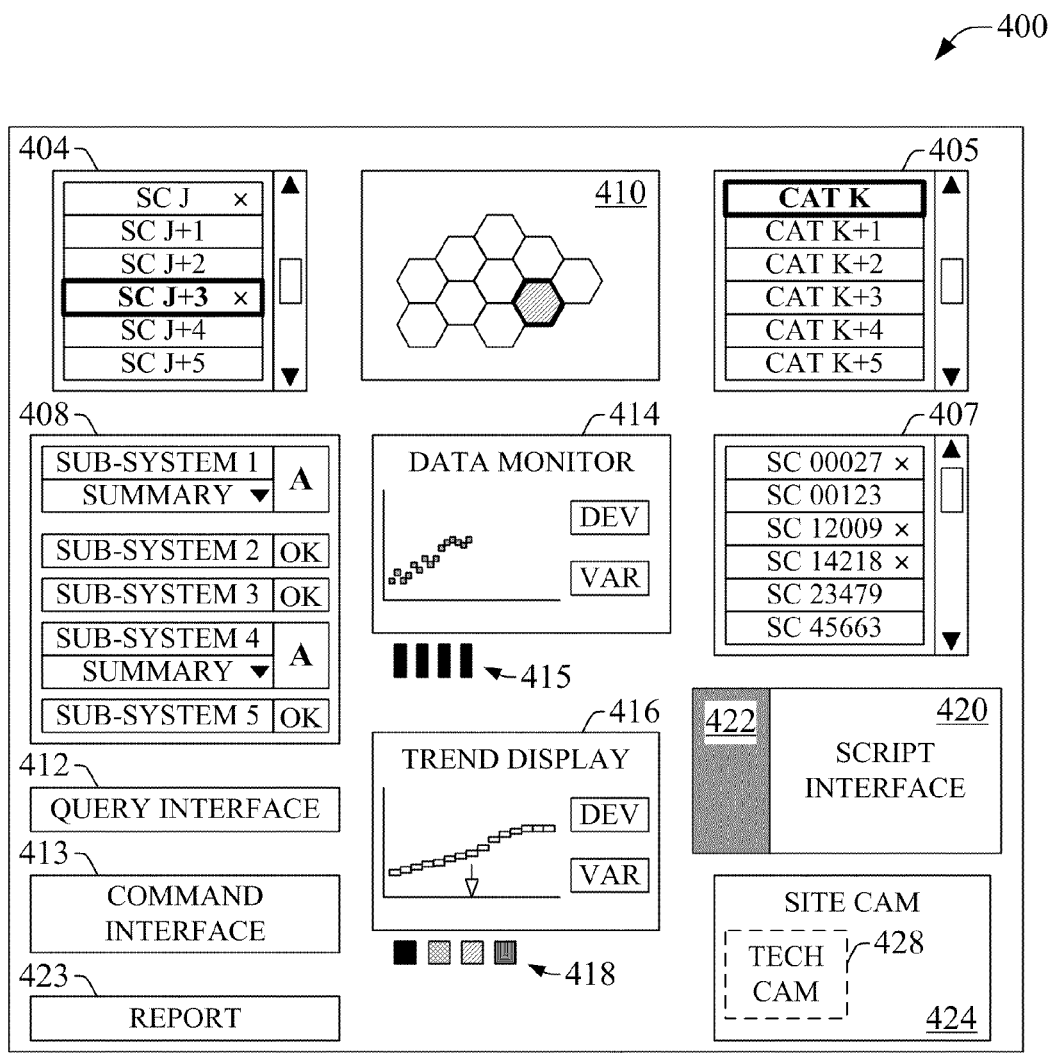
FIG. 4 presents a schematic snapshot of an example graphical user interface (GUI) in accordance with aspects described herein.

FIG. 3 illustrates an example embodiment 300 of an interface component 214 in accordance with aspects described herein. Display component 304 can supply at least one of data or signaling that allow rendering features of a configured monitoring and control environment in at least one of a display local to interface component 214, or a remote display such as a display local to one or more terminal(s) 260. The rendered features can be conveyed in at least one of a text-based interface, a web-based interface, or a graphic interface. As an illustration, FIG. 4 presents a schematic snapshot of an example graphical user interface (GUI) 400 rendered at least in part through data and signaling supplied by display component 304, and generated as a part of configuration of a monitoring and control environment. Various disparate GUIs with disparate monitoring and control features can be rendered via display component 304. In an aspect, GUIs can be rendered in accordance with access credential(s) of a requester authorized to access management platform 210.

In addition, embodiment 300 of interface component 214 includes a selector component 308 that can generate a view of data, or parse data, associated with at least one of specific deployed cell sites and sub-system(s) thereof, or deployment-wide sub-system categories. Categories can include at least one of a radio operation category, a power system category, a security and safety category, a heating, ventilating, and air conditioning (HVAC) group, or the like. Generation of views or data parsing can be attained at least in part through signaling received at interface component 214 in view of agent-terminal interaction. Based at least in part on such signaling, data selector component 308 supplies collected data or operational intelligence, such as alarm conditions, originated in a site controller.

In an aspect of the subject innovation, a set of conditions entered in a status profile can control view generation or data selection. Edition of an extant or new status profile can be accomplished through script interface 420, which can include toolbar(s) 422 that affords graphic-based generation of scripts, e.g., through drag-and-drop gestures, that define or modify a status profile. Script interface 420 also can allow selection of an extant script, e.g., retained in a memory within management platform, and facilitated execution of the selected script. Interface component 214, e.g., through display component 304, receives script information input at script interface 420 and supplies such information to monitor component 216. Script interface 420 can afford various schemas for script generation, such as hypertext markup language (HTML) and extensible markup language (XML) and variants (e.g., state chart XML (SCXML)), that are portable among computing platforms, wireless (e.g., a portable computer or mobile device) or otherwise. In addition or alternatively, script interface 420 afford generation of a script in accordance with object-oriented computing languages employed by a device, wireless or otherwise, such as Delphi, ASP.NET, Visual Basic, Python, Perl, Java, C++, and C#, and circuitry programming level languages such as Verilog.

In example GUI 400, view(s) specified through a status profile, e.g., via polling conditions, can be cast as selection menu 404 that presents, e.g., in a vertical scroll format, a set of site controllers that includes at least site controller J through site controller J+5, with J a natural number and J+5≦N. Through predetermined indicia, e.g., a cross, selection menu 404 accentuates those site controllers that in alarm condition. Selection of a site controller, such as SC J+3, highlights the selection and locates the selected SC, e.g., dashed cell, in a floor plan viewport 410. In addition, selection of a site controller generates a summary viewport 408 that renders a high-level snapshot of conditions of addressable sub-system(s), or peripheral device(s) thereof, included in the cell site associated with the selected site controller. As an illustration, panel 408 illustrates five sub-systems that comprise the selected cell site: three of which display "OK" status, as determined by the set of conditions in a status profile, and two sub-systems that convey an alarm indication "A" and an associated "Summary," which can be accessed through a drop-down arrow button. A "Summary" conveys operational conditions of the one or more peripheral devices associated with the sub-system that exhibits an alarm condition. Alternatively or additionally, summaries can be accessed for sub-systems that are in "OK" condition. In another aspect, example GUI 400 provides for selection of sub-system categories, which can be accomplished through vertical scroll selection menu 405 that, as illustrated, includes at least six categories CAT K-CAT K+5. Selection of a sub-system category, e.g., smart antenna or microwave radio system, highlights the selection and generates a list 407 of deployed site controllers that include the selected equipment. Through predetermined indicia, e.g., a cross, the list conveys sub-systems in alarm condition. As illustrated in GUI 400, list 407 can be browsed through scroll gestures.

In another aspect, selector component 308 can receive and process a query that can probe data storage 244 (not shown in FIG. 3) and generate a view of the data. A query can be received from an authorized terminal, and set forth via query interface 412 in example GUI 400. A query can be cast in accordance with various query languages, such as SQL, PostgreSQL, XQuery, Multidimensional Expressions (MDX), Common Query Language (CQL), Data Mining Extensions (DMX), Object Query Language (OQL), and the like.

Collected data can be displayed in data monitor 414, which can include one or more display formats other than the illustrated scattered data representation. As illustrated, data monitor panel 414 can render a set of data associated with a specific peripheral device "DEV" in a sub-system and a related operational variable "VAR" as a function of time or other variable that determines, at least in part, the magnitude of "VAR." As an example, "VAR" can be a tilting angle of an antenna panel (e.g., a remote electrical tilt (RET) antenna), which can be affected by wind or other meteorological conditions at the cell site. Peripheral devices that are part of a selected sub-system can be selected through indicia 415. It should be appreciated that, in an aspect of the subject innovation, data that originates from a set of two or more cell sites also can be displayed in data monitor 414.

In addition, operational data received at management platform 210, e.g., at monitor component 216, in accordance with one or more configured conditions in a status profile can be modeled and prediction of such data can be performed through simulations. Outcomes of at least one of modeling or simulation of data can be part of a data trend, which can be conveyed in a trend display 416. It is noted that a data trend also can include historical data. As an illustration, the arrow in trend display 416 points to the latest instant at which operational data has been received. Various simulation models, illustrated schematically as disparate indicia 418, can be available to predict data; the models 418 can include molecular dynamics simulations, Monte Carlo simulations, empirical modeling, etc. It is noted that available models can be conveyed through disparate indicia such as a scroll-down menu, pop-up windows, or the like.

Indicia 423 allow request(s) of report generation based at least in part on the monitored operational data, and implemented queries and commands. Information on data trends as revealed, for example, through trend display 414, also can be included in a report requests. Similarly, alarm conditions associated with one or more sub-systems, or peripheral devices thereof, also can be reported upon request.

Visual access to at least portions of one or more cell sites can be attained through a site camera panel 424 in example GUI 400. Selection of imaged cell site can be effected through selection menu 404. Such images can be obtained via a closed circuit television (CCTV) system deployed at a cell site; the visual information transported through link(s) 235. Credentials of a requester that access management platform 210 can dictate, at least in part, availability of site cam 424 to the requester. Site cam 424 can afford a "tech cam" 428 that provides interactive communication with technical personnel that visits a cell site. Voice communication associated with tech cam 428 can be effected through push-to-talk (PTT) capability(ies), voice-over-internet (VoIP) protocol transported through link(s) 235, or the like. A telecommunication network in which management platform 210 resides can provide hardware and software, or firmware, which implements PTT or VoIP. In an aspect, it should be appreciated that tech cam 428 also can facilitate interaction with an automated agent, e.g., an intelligent robotic component, to effect service and maintenance procedures. At least one advantage of "tech cam" 428 is that it can make cell site visits efficient by providing real-time, or nearly real-time, information and feedback to technical personnel conducting maintenance or repairs.

Figure 5:
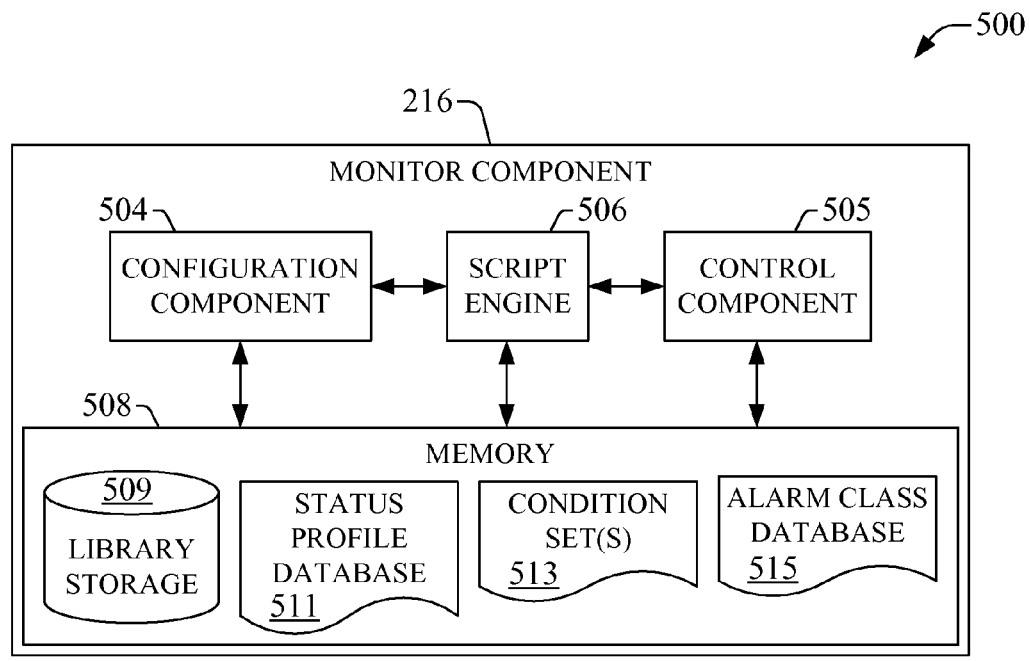
FIG. 5 is a block diagram of an example embodiment of a monitor component in accordance with aspects of the subject innovation.

FIG. 5 is a block diagram of an example embodiment 500 of a monitor component 216 in accordance with aspects described herein. Monitor component 216 includes a script engine 506 that can receive script(s), or script(s) information, from interface component 214, and generate at least one of status profile(s) or alarm class(es). Generated scripts can configure one or more conditions that determine a rate of data collection, e.g., data polling rate or sampling rate, for a port or peripheral in a site controller (e.g., site controller N $230_N$). Script engine 506 can retain script(s), or script(s) information, in library storage 509 within memory 508. While library storage 509 is illustrated as residing within monitor component 216, it should be appreciated that library storage 509 can be at least in part included in primary memory 240. Generated status profile(s) or alarm class(es) can be committed, or mounted, to one or more site controllers $230_\lambda$ through configuration component 504. Commitment can include delivery of status profile(s) and alarm class(es) to the one or more site controllers (e.g., site controller 2, site controller N-1). In an aspect, such delivery can be effected through control signal(s) 239 transported in a control channel in a link 235. Configuration component 504 can include (i) generation and retention of status profile database 511, and alarm class database 515 within memory 508, and (ii) extraction and retention of condition set(s) 513. In an aspect, an alarm condition, in an aspect can be defined as an SNMP trap.

Additionally, a control component 505 can convey a command or a directive to a site controller $230_\lambda$ via, for example, control signal(s) 239. In an aspect, commands or directives are part of a generated script that is executed, at least in part, by control component 505. Alternatively or additionally, a command or directive can be received from interface component 214 in response to input in command interface 413. Commands or directives can be intended to manipulate remotely the operation of a peripheral device connected to site controller $230_\lambda$. In an aspect, commands and directives provide for implementation of closed-loop feedback control through data 237 received at monitor component after manipulation of a peripheral device is conducted. For instance, control component 505 can execute, at least in part, a script in order to reset a temperature setpoint in a thermostat in a sub-system connected to site controller $230_\lambda$. The script can be executed at scheduled instances, e.g., on a monthly basis, a weekly basis, a daily basis, an hourly basis or at substantially any frequency, or asynchronously as deemed necessary by a remote user.

Figure 6:
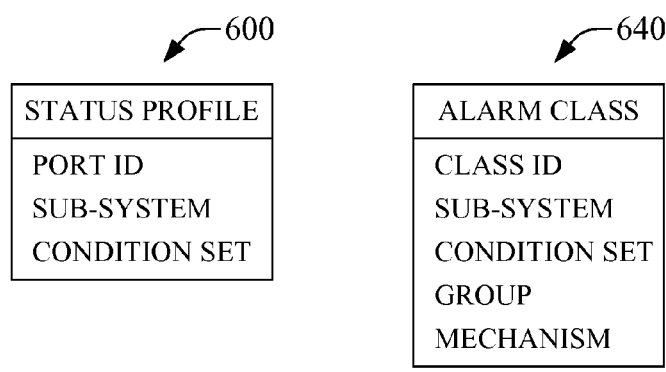
FIG. 6 presents schematic illustrative structures of status profile and alarm class in accordance with aspects described herein.

FIG. 6 presents schematic illustrative structures of status profile 600 and alarm class 640 in accordance with aspects described herein. Example status profile 600 can be configured as a table that includes three keys: First, a port ID key, which identifies a port that is configured through the status profile. Port ID can be a primary key. Second, sub-system key associates a sub-system to the port ID. Third, a condition set attribute that establishes at least one of condition(s) to poll a sub-system; condition(s) that characterize status of the sub-system, e.g., power generator is on; or a logic NULL condition that represents that set of conditions is empty.

Alarm class 640 also can be cast as a table. Class ID attribute is a primary key that identifies a sub-system. Sub-system attribute identifies a sub-system that is alarmed. It should be appreciated that sub-system attribute can be a foreign key to a child table that associates the sub-system to a port, identified via port ID. Alarm class 640 also includes a condition set attribute that defines one or more conditions that can trigger an alarm indication. A group attribute specifies a set of recipients of one or more alarm indications triggered by a set of conditions. An alarm recipient can be at least one of an apparatus, mobile or otherwise, that resides within a system that hosts management platform 210, or an apparatus or device external to the system that administers management platform 210. As an illustration, an alarm recipient can be a mobile device of a field technician or engineers, or a terminal of a network administrator or analyst. As another illustration, a recipient can be a specific email account configured and stored in an email server.

Additionally, alarm class includes a mechanism attribute that designates a format and transport modality to deliver an alarm indication to recipients determined by the group attribute. As an example, mechanism attribute can establish delivery through email communication. As another example, mechanism attribute can identify a Q-bit word, with Q an integer greater than one, as an alarm indication. It should be appreciated that at least one advantage of delivery of a multi-bit word alarm indication is that the severity of the alarm can be encoded in a lightweight manner; for instance, a two-bit alarm indication can afford $2^2$ degrees of alarm severity in addition to conveying a logic indication that an alarm is triggered.

Status profile(s) and alarm class(es) also can be defined as object-oriented class(es) or substantially any other data structure that can at least be exploited within a monitoring script, and can be portable among various software or firmware applications such as database management software.

Figure 7:
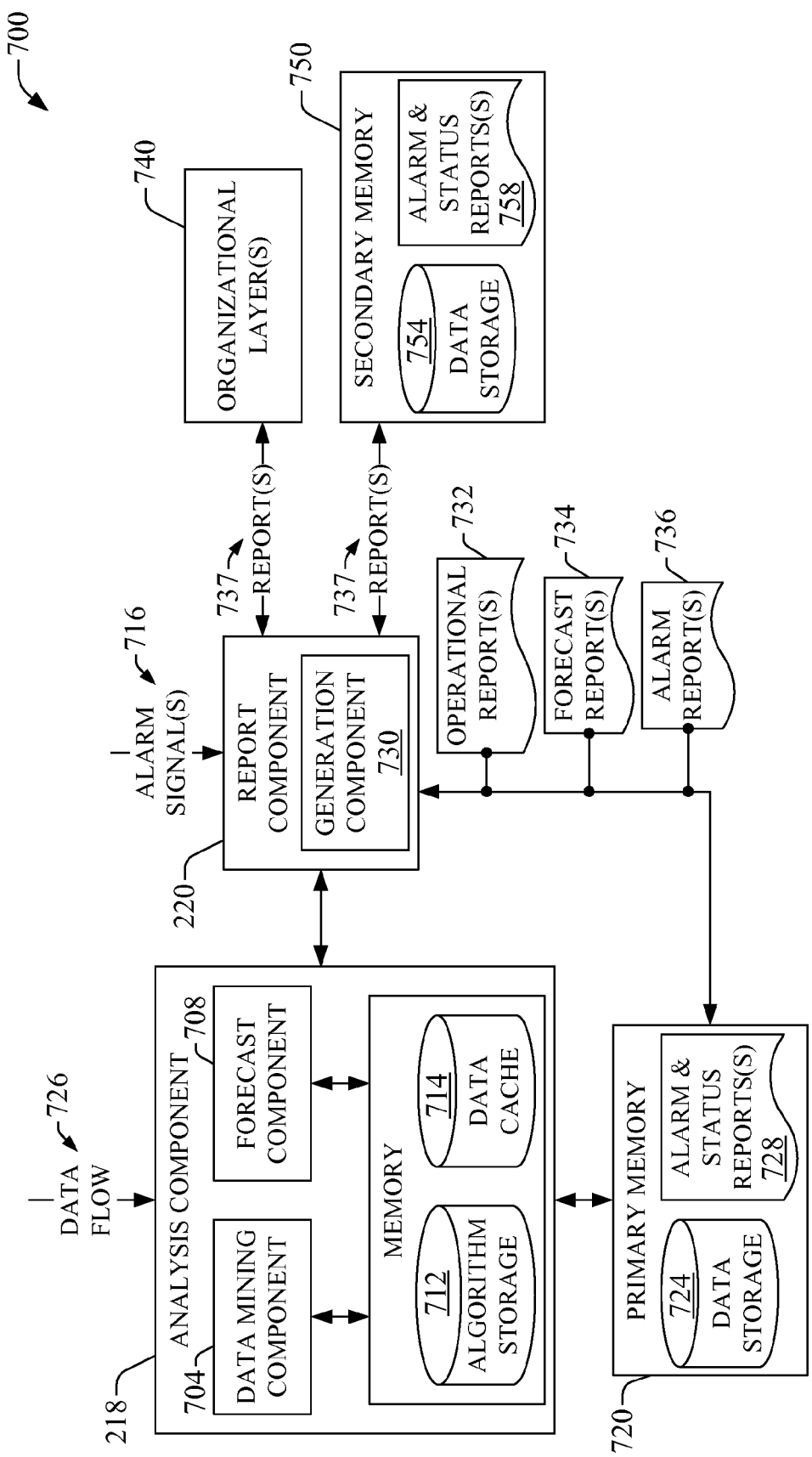
FIG. 7 illustrates a block diagram an example system that generates and delivers report(s) related to data gathered through one or more site controllers in accordance with aspects described herein

FIG. 7 illustrates a block diagram an example system 700 that generates and delivers report(s) related to data gathered through one or more site controllers, e.g., site controllers 230₁-230_N, in accordance with aspects described herein. Generated report(s) include at least two broad categories: (1) Data report and (2) alarm report. Report component 220, can create data reports based at least in part on analysis of collected data, which can be retained in primary memory 720. Report(s) can be generated in real-time mode, or near real-time mode, as data (e.g., data flow 726) is streamed to analysis component 218. In such a scenario, generated report(s) is conveyed as a content(s) stream. Report(s) also can be generated in a scheduled manner through evaluation of parcels of aggregated data, retained in data storage 724, that correspond to predetermined time interval(s), e.g., an hour, a day, a week, a month, or the like. In an aspect, a predetermined time interval can be defined in a status profile, within a condition set.

Analysis component 218 can include a data mining component 704 that can extract data from data storage 724. Features of extracted or received data, such as computation of statistics (e.g., average, variance and standard deviation, covariance matrices . . . ); generation of views, e.g., specific subsets of data; patterns; time and space correlations; data connectivity; etc., can be produced through implementation of one or more mathematical algorithms for analysis of time-series from disparate sources (e.g., each sub-system, or peripheral thereof, in a set of site controllers). Algorithm(s) can be retained in algorithm storage 712 or substantially any component, or memory therein or functionally coupled thereto, in a mobile or non-mobile network that hosts management component 210. Analysis component 218 can convey analyzed data to report generation 220 which can summarize and format the received data through generation component 730, and produce operational report(s) 732. Such report(s) can be conveyed to primary memory 720, to be retained in alarm and status report(s) 728.

Additionally, analysis component 218 can process operational data through a forecast component 708; the operational data can be received data that is retained in data storage 724, or data streamed from one or more site controllers 230_λ. Forecast component 708 can simulate data and predict data values for a set of one or more sub-systems, or peripheral devices thereof, in a set of site controllers. As described above, simulation can include at least one of molecular dynamics simulations, Monte Carlo simulations, game theoretic simulations, or the like. Algorithms associated with such simulations and related models can be retained in algorithm storage 712, or in substantially any component, or memory therein or functionally coupled thereto, in a mobile or non-mobile network that hosts management component 210. Through modeling of collected data, analysis component can produce temporal or spatial data trends. Temporal trends include historical data in addition to predicted data (see, e.g., panel 416 in FIG. 4). Spatial trends can reflect data behavior associated with specific cell sites, e.g., failure of radio equipment acquired from a specific vendor and deployed in particular marketplaces such as cell sites that provide services based upon LTE Advanced radio technology. Simulated data can be summarized in forecast report(s) 734, which can be retained in alarm and status report(s) 728 in primary memory 720. Predicted data also can be conveyed to primary memory 720 and retained in data storage 724.

Analysis component 218 also can include data cache 714 to retain streaming data, e.g., data flow(s) 726, to conduct various types of analysis described herein. Data stored in data cache 714 can serve as a training set for generation of models that allow simulation of data. Cached data in data cache 714 also can serve to conduct integrity test(s) of selected data, to ensure collected data received from a site controller 230_λ is not corrupted, or data collection features such as data polling rate is appropriate for a specific type of analysis. Analysis component 218 can flush data cache 714 periodically, or at predetermined intervals.

Analysis component 218 or one or more components therein can exploit artificial intelligence (AI) methods to infer (e.g., reason and draw a conclusion based upon a set of metrics, arguments, or known outcomes in controlled scenarios) relationships between operational data retained in data storage 724 or data cache 714; or optimized polling conditions or status conditions that can be part of an autonomously defined stats profile. Similarly, analysis component 218 can utilize alarm report(s) to infer alarm conditions that optimize a utility trade-off between the cost of tending to an alarm indication and the benefit there from. Moreover, analysis component 218 can exploit AI methods to conduct at least part of data forecasting or data simulation.

Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, analysis component 218, or components therein, can employ one of numerous methodologies for learning from data and then drawing inferences from the models so constructed. Such methodologies can be retained in memory 325 (not shown). For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

Report component 220 also can generate alarm report(s) 736 based at least in part on at least one of alarm signal(s) 716 or analysis thereof. Such alarm signal(s), or indication(s), can be received from one or more site controllers $230_\lambda$ in accordance at least in part with defined alarm class(es). Generation component 730 can exploit analysis component 218, and components therein, to include additional information related to alarm signal(s) 716. In an aspect, the additional information can include time stamp(s) of an alarm, service features of cell site originating an alarm, and so on. Analysis included in alarm report(s) 736 can comprise projection analysis, or forecast, of peripheral device failure. Such projection can be global, e.g., include all operational site cell controllers, or limited to a specific set of site controllers.

Report(s) 737, which include at least one of operational report(s) 732, forecast report(s) 734, or alarm report(s) 736, can be delivered to various operational layers 740 within at least one of a mobile network or a non-mobile network operated by a service provider that provides and administers management platform 210. Examples of organizational layer(s) 740 include, a business layer, an operation and maintenance layer (e.g., an operations and maintenance (O&M) server), or the like. Additionally, report(s) 737 can be conveyed to a secondary memory 750, and retained in alarm and status report(s) 758; secondary memory 750 also can retain data collected through management platform 210, and can reside within one or more of the systems described above.

While analysis component 218 and report component 220 are illustrated as separate entities in example system 700, it is noted that in additional or alternative embodiments, such components can be consolidated in to a single component; e.g., analysis component 218 resides within report component 220, or vice versa.

In an aspect, server(s) 222 (not illustrated in FIG. 7) can implement, at least in part, algorithm(s) for analysis or modeling, and can provide functionality of analysis component 218 and report component 220.

Figure 8:
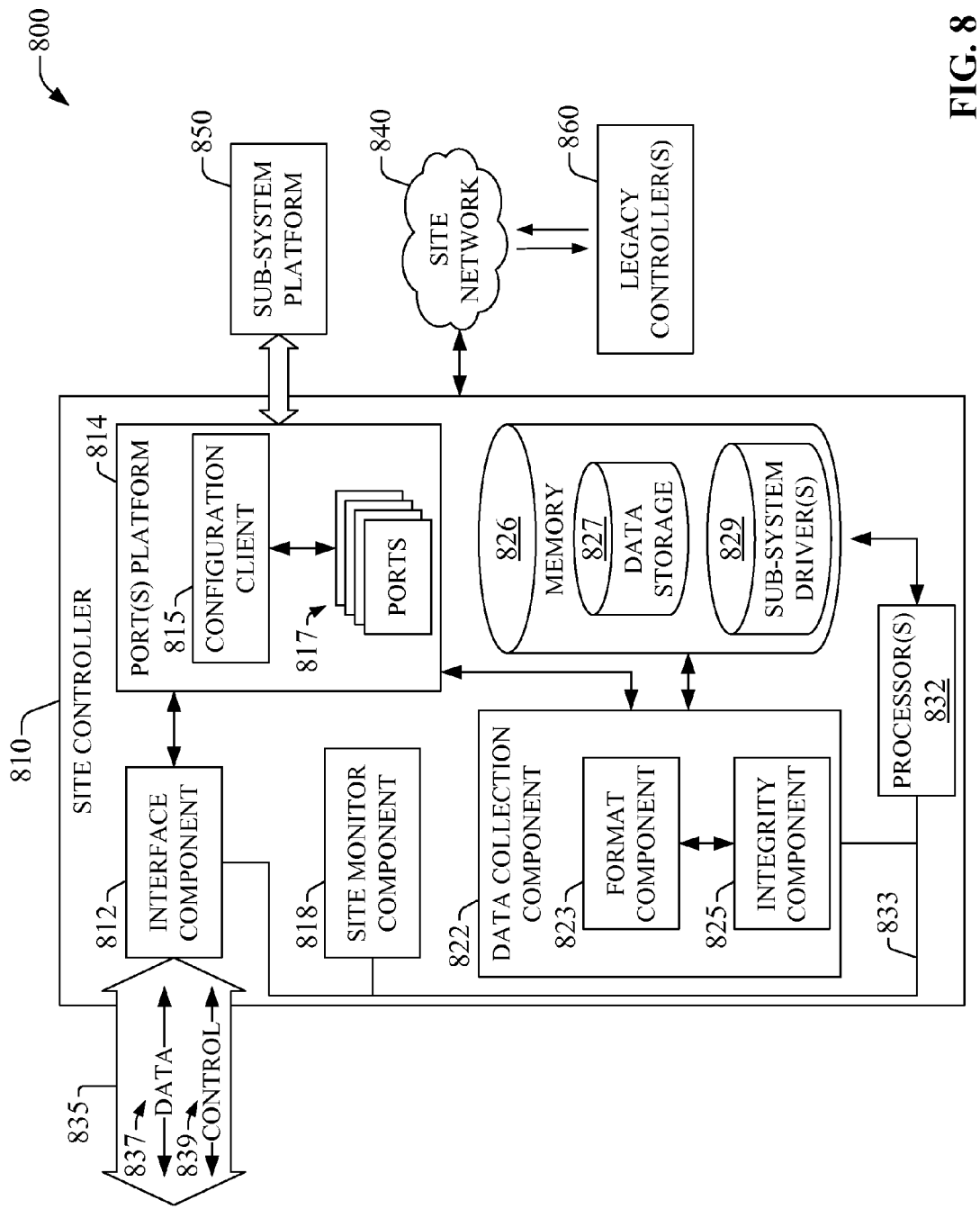
FIG. 8 is a block diagram of an example embodiment of a site controller in accordance with aspects disclosed herein.

FIG. 8 is a block diagram of an example embodiment 800 of a site controller in accordance with aspects disclosed herein. Example site controller 810 embodies a site controller $230_\lambda$. Interface component 812 exchanges data 837 and control signal(s) 839 through wired or wireless link 835. Interface component 812 also includes elements that convey aural or visual indicia, such as speakers, light emitting diodes (LEDs), liquid crystal displays (LCDs), electrochromic displays, or the like. Data 837 includes configuration information such as status profile(s), e.g., status profile 600, and alarm class(es), e.g., alarm class 640. Received status profile(s) are conveyed to configuration client 815 in port(s) platform 814 in order to configure one or more of ports 817, which can include parallel ports (e.g., GPIB, IEEE-1284), serial ports (e.g., RS-232, V.11, USB, FireWire or IEEE-1394 . . . ), Ethernet ports, V.35 ports, X.21 ports, or dry contacts, or the like. It should be appreciated that port(s) platform 814 includes a physical dock that supports physical connectors for respective ports 817. In addition, interface component 812 delivers, via data 837 through link 235, operational data collected from a sub-system, or a peripheral device therein that is part of sub-system platform 850. Moreover, interface component 812 can deliver, via site monitor component 818, a directive or a command to a sub-system in sub-system platform 850. Such directive or command can be received through control signal(s) 839, and provide control of or specify data measurement instance(s) for one or more peripheral devices associated with the sub-system for which the directive or command are intended. In an aspect, such directive(s) and command(s) can be part of a script carried out by management component 210, e.g., trough monitor component 216.

Site monitor component 818 polls sub-system platform 850, which can include one or more peripheral devices associated with respective ports 817, in accordance with configuration of the ports 817. As an example, polling condition(s) in a received status profile (e.g., status profile 600) can program site monitor component 818 to collect data from a specific device in a sub-system at specific time intervals, such as a periodically with period τ as conveyed in the status profile, or at scheduled instants spanning a predetermined time interval. Schedules for data polling can be cyclic, in that repeat a set of time interval every predetermined time interval, such as every 24 hours, every 7 days, every 30 days or a month, etc. In an aspect, polling of a sub-system, or one or more peripheral device(s) therein, includes implementation of handshake protocol(s), or procedures, with the sub-system. Such handshake procedures determine that a sub-system, or a peripheral device therein, is available to communicate (e.g., transmit or receive) data and establish a data session. Handshake procedure(s) can be dictated, at least in part, by sub-system driver(s) 829 retained in memory element 829. It is noted that software applications or firmware applications (e.g., executable code instructions, compiled code instructions, linked code instructions or libraries, templates classes or other object, or the like) can be retained in memory 829; in an aspect, the software applications or firmware applications, and respective updates thereof, are received from a management platform or a server that embodies the management platform. In another aspect, site monitor component 818 exploits data collection component 822 to retrieve data and retain such data, and to convey the gathered operational data through interface component 812. Collected operational data can be delivered to management component 210 through link 835, and retained locally in data storage 827, which is part of memory 826.

Data collection component 822 can include a format component 823 which arranges collected operational data into a format suitable for communication over link 835 and that can be manipulated by an intended recipient of such data, e.g., interface component 214 or analysis component 218. Collected operational can be delivered to at specific instants as defined in polling condition(s) received in a status profile that configures one or more ports in port(s) 817. Format component 823, for example, can transform analog data into digital data for communication over link 835. As another example, format component 823 can compress data to reduce packet payload and mitigate communication error rates (e.g., bit error rate, frame error rate, block error rate . . . ). Yet another example, format component 823 can cast data into a universal communication format, such as a packet with a specific payload size and one or more management packets that convey how data is to be processed at a recipient's end. In addition, to promote or ensure safety, format component 823 can encrypt data prior to delivery by interface component 812; disparate types of data can be encrypted to disparate degrees of complexity, such complexity can be specified through one or more conditions received through a status profile.

In data collection component 822, an integrity component 825 can evaluate gathered operational data or formatted data to ensure data integrity. Evaluation can include at least one of implementation of a checksum such as cyclic redundancy check, or determination of communication errors arising from one or more peripheral devices engaged in a data session, e.g., a specific equipment fails to send data. In a scenario that includes a communication error, integrity component 825, assisted at least in part by site monitor component 818, can carry out a retry cycle with a predetermined number of M retry attempts, with M a natural number, as configured in a status profile.

Additionally, integrity component 825 can monitor whether site controller 810 is bypassed when maintenance is conducted at the cell site, and report through interface component 812 any changes in configuration of site controller 810 or sub-system(s) to management component 210, or a network operation center; alarm component 914 can assist, at least partially, in performing such monitoring and reporting.

Figure 9:
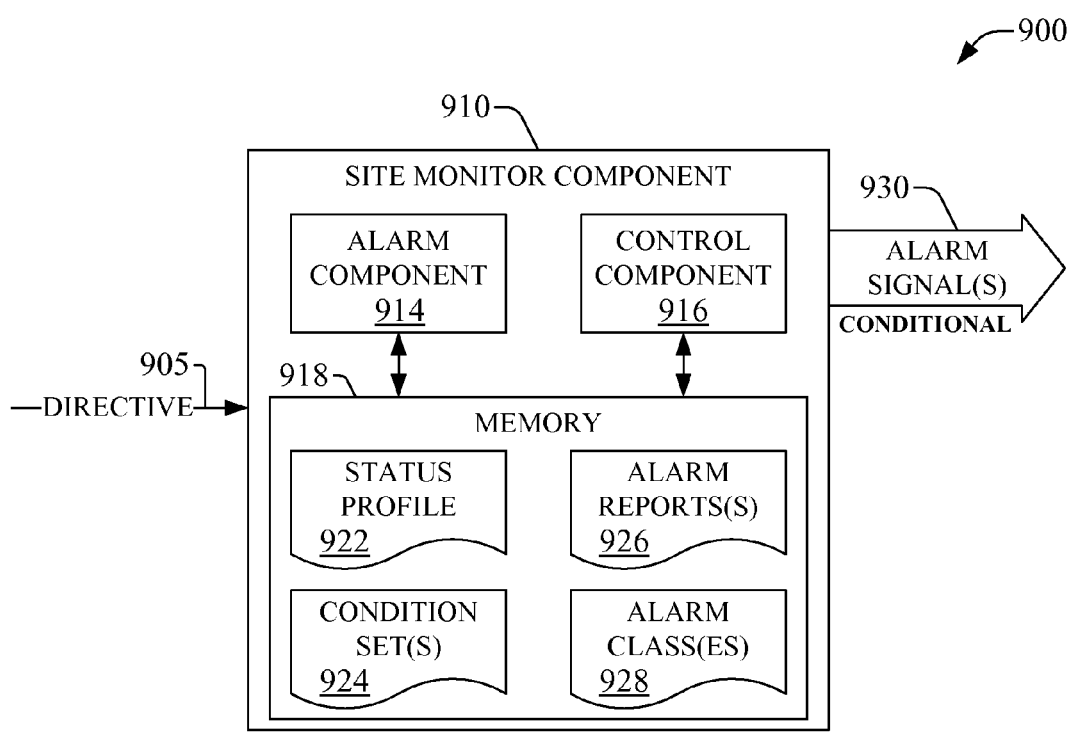
FIG. 9 presents a block diagram of an example embodiment of a site monitor component in accordance with aspects described herein.

Site monitor component 818 also can generate alarm signal(s) related to sub-system operation based at least in part on received alarm class(es). In an aspect, as illustrated in example embodiment 900 in FIG. 9, example site monitor component 910 can include an alarm component 914 that can generate alarm signal(s) 930, or indication(s), and convey such signal(s) through control signal(s) 839. Additionally, alarm signal(s) 930 can be included, at least in part, in alarm report(s) which can be retained in memory element 926. Received status profile(s) can be retained in memory element 922, and received alarm class(es) can be retained in memory element 928. It should be appreciated that while memory 918 is illustrated as local to site monitor component 910, it also can reside at least in part within memory 826. Such alarm signal(s) 930 are conveyed to management component 210 through interface component 812 via link 835. In another aspect, when interface component 812 has wireless capabilities, e.g., it includes a wireless card such as a SIM card, USIM card, or the like, and link 835 allows wireless communication, alarm signal(s) 839 can be delivered to a specific group of recipients determined at least in part by group attribute in an alarm class, as discussed above. Such wireless communication can be implemented, for example, via satellite or through a point-to-point communication with an intended recipient; e.g., a law enforcement organization, or emergency first responders such as firefighters or paramedics (e.g., in case a field technician or other personnel falls from the cell site toward during repairs).

Site monitor component 910 also can receive and implement, at least in part, directives 905. Implementation includes execution of the received directive 905, and can be accomplished through control component 916. In addition, implementation of a received directive or command can include examination of the received directive or command to determine whether the format of the directive or command is compatible with a signaling protocol of a device for which the directive or command is intended. Control component 916 can perform such examination, or integrity check. A failed integrity check, can result in control component 916 issuing an error message to a management platform associated with site controller 810, or formatting the received directive or command in accordance with the native signaling protocol. In an aspect, commands or directives are part of a generated script or in-line command that is executed by a platform or a server that manages site controller 810. Implementation of directive 905 affords control of operation of a peripheral device functionally connected to site controller 810. In an aspect, commands and directives are part of a closed-loop feedback control of operation of the peripheral device. Directive 905 can be received at scheduled instances, e.g., on a monthly basis, a weekly basis, a daily basis, an hourly basis, or asynchronously.

In an aspect of the subject innovation, site controller 810 can integrate operation of various sub-systems, or peripheral devices therein, through site network 840, which can be embodied in an intranet or local area network (LAN) within a cell site. In addition, site network 840 can allow to integrate legacy controller(s) 860 with site controller 810. Sub-system drivers 829 can facilitate, at least in part, communication with legacy controller(s) 860. As an example, a controller of an RET antenna can be integrated with site controller 810. Similarly, most any legacy controllers can be integrated with site controller 810 via site network 840, for example.

Processor(s) 832 includes at least one processor, and can be functionally connected to each component and memory within site controller 810 and confer, at least in part, the described functionality of such components. Processor(s) 832 can connect to components included in site controller 810 through bus 833, which can be embodied in one of various bus architectures. Processor(s) 832 can execute code instructions stored in a memory, e.g., memory 826, to provide at least in part the functionality of one or more of the components that reside within site controller 810.

Figure 10:
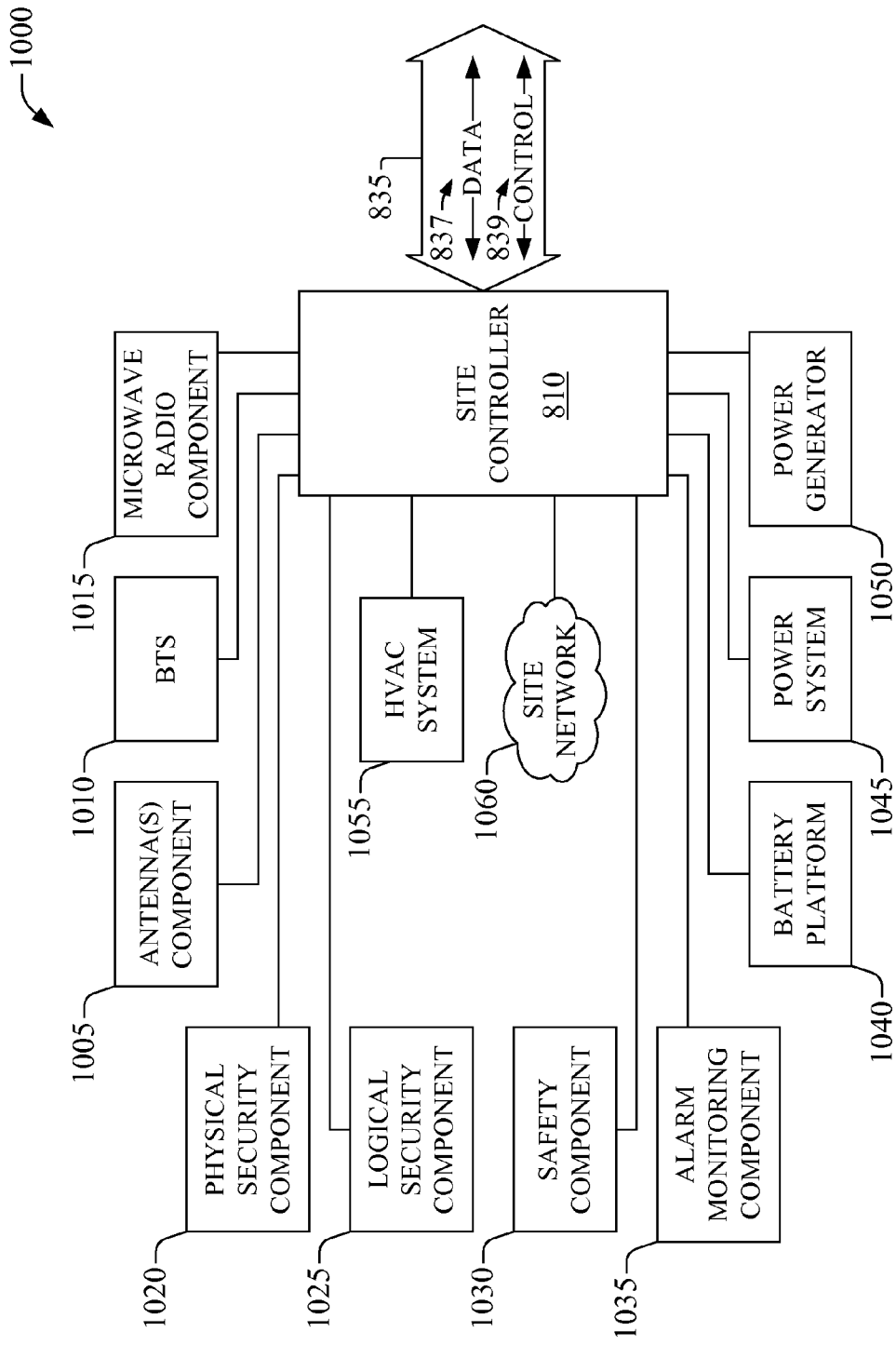
FIG. 10 illustrates a block diagram of a set of example sub-systems that can be monitored and controlled, at least in part, through a site controller in accordance with aspects described herein.

FIG. 10 illustrates a block diagram 1000 of a set of example sub-systems that can be monitored and controlled through site controller 810 in accordance with aspects described herein. As described above, each sub-system can include a set of one or more peripheral devices. Sub-systems are functionally coupled to site controller 810 through ports, e.g., ports 817, and suitable connectivity links, e.g., cables, relays, switches, etc., illustrated as solid lines. In block diagram 1000, the set of example sub-systems includes 12 sub-systems that can be categorized in four groups: (i) a radio telecommunication group; (ii) a security group; (iii) a power group; and (iv) a heating, ventilating, and air conditioning (HVAC) group. It should be appreciated that grouping of sub-systems connected to a site controller can facilitate management of the sub-systems through creation of operational categories (see FIG. 4). It should be further appreciated that two or more components or elements within each sub-system group that are illustrated as separate entities can be integrated into a single component or element. Group (i) includes antenna(s) component 1005, base transceiver station (BTS) 1010, and microwave radio component 1015. Antenna(s) component can include RET antenna(s) for single-band or multi-band operation, smart antenna assemblies for single-band or multi-band operation, satellite dish antenna(s), microwave antenna(s), and so forth. BTS 1010 can include a tower and can span real estate dedicated to cell site. In addition, BTS 1010 can include electronic equipment, e.g., codecs, modems, analog-to-digital converters, digital-to-analog converter, and so on, to effect telecommunication. Likewise, microwave radio component 1015 can include dedicated components for telecommunication within the microwave spectrum of electromagnetic radiation, and associated telecommunication protocols such as WiMaX.

Group (ii) includes a physical security component 1020 which can include peripheral devices that operate, at least in part, devices that monitor cell site such as video camera(s) in a CCTV system, and actuate deterrence elements such as high-voltage lines in a fence surrounding a cell site. Physical security component 1020 also can include access devices that grant or deny, at least in part, physical entry to a cell-site such as intelligent locks (e.g., password-protected locks; biometrics-protected locks, which can include at least one of voice recognition, iris recognition, or fingerprint recognition in order to grant access. Site controller 810 can monitor or control access through a status profile that establishes a set of conditions for physical security component 1020, and record access logs, e.g., in memory in site monitor component 910. In addition, logical security component 1025 can complement or supplement functionality of physical security component 1020. In an aspect, such component 1025 can probe data integrity to identify malicious or unauthorized data generation and consumption, e.g., by peripheral devices or software application(s) in execution that are foreign to cell site sub-system. Moreover, group (ii) includes a safety component 1030 that can monitor hazardous conditions such as smoke and fire conditions, and can actuate remediating devices such as water sprinklers. Safety component 1030 also can include control components that can switch off power to specific components or elements within cell site, in accordance with one or more status profiles and alarm classes. Furthermore, an alarm monitoring component 1035 is included in group (ii). Such component 1035 can monitor cell-site intrusion events, and trigger an alarm when such an event occurs. Alarm monitoring component 1035 also can trigger alarms based on smoke and fire conditions. In an aspect, alarms are triggered locally in the cell site, and an indication of the alarms can be conveyed to management component 210 through site monitor component 818 via interface component 812.

Group (iii) can include a power system 1045 that can supply power to one or more sub-systems at the cell site associated with site controller 810. Such sub-systems form a grid of loads for power system 1045, which can include a set of power supplies and a power controller that can be monitored and administered through commands received at site controller 810 in response to one or more conditions of the power system 1045, as specified in status profile(s). As an example, site controller 810 can deliver a directive to turn off power supplied to a set of loads, e.g., physical security component 1020, for a predetermined time interval, and turn the power back on after the time interval elapses. As another example, site controller can adjust output of power system 2045 to ensure that VSWR in a radio frequency (RF) line that feeds antenna(s) component 1005 is maintained within a configured condition as dictated in status profile(s). Group (iii) also can include a battery platform 1040 to provide back up power supply to one or more loads served by power system 1045. Battery platform 1040 can include a solar energy converter, e.g., solar panel(s), sun-tracking component(s), cables, etc., that maintains the set of batteries charged. Site controller 810 can monitor battery charge levels and operation of the solar energy converter and elements therein, and convey directive(s) based at least in part on status profile(s) configured for port(s) associated with battery platform 1040. Moreover, group (iii) can include a power generator 1050 which also can provide power when power system 1045 becomes non-operational, and charge the set of batteries in battery platform 1040. Site controller 810 can provide command(s) that dictate operation mode of power generator 1050 based at least in part on one or more configured status profiles.

In group (iv), HVAC system 1055 can include conventional entities present in such a system; for example, boilers, heat exchangers, heat pumps, furnace, air-conditioning units, ducts and vents, thermostats, and the like. Site controller 810 can monitor data generated by one or more components within HVAC 1055 and control operation of the one or more components in accordance with configured status profile(s). Site controller 810 can monitor temperature of cell site as provided by one or more thermostats, and receive a directive, e.g., through control 239, to adjust setpoints in the one or more thermostats in response at least in part to a set of conditions in a status profile or historical temperature data. In an illustrative scenario, a thermostat in the cell site associated with site controller 810 can be checked or set at particular intervals throughout the day. If the thermostat is set to 60° F. by a technician while performing maintenance in the cell site associated with site controller 810, and the technician does not reset the thermostat to a predetermined setpoint, e.g., 72° F., site controller 810 can convey such condition in response to a status profile, and receive a command to switch the setpoint form 60° F. to 72° F. Management component 210 can provide such a command via at least one of a script that can be run daily or at any other frequency, or intervention of a remote agent.

As described above, site network 1060 can provide, at least in part, integration of two or more sub-systems in the foregoing groups (i)-(iv). Legacy controllers also can be integrated with site controller 810 via site network 1060. It is noted that the number of sub-systems illustrated in diagram 1000 is extensible. Added sub-systems can be assigned available ports within site controller 810, port(s) can be reconfigured to communicate with added sub-systems, or new ports can be added to a port(s) platform 814 and configured.

In view of the example systems described above, example methods that can be implemented in accordance with the disclosed subject matter can be better appreciated with reference to flowcharts in FIGS. 11-19. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) or call flows may represent methods in accordance with the disclosed subject matter when disparate entities can enact disparate portions of the methods. Furthermore, not all illustrated acts may be required to implement a methodology in accordance with the subject specification. Further yet, two or more of the disclosed methodologies can be implemented in combination with each other, to accomplish one or more features or advantages herein described. It should be further appreciated that the example methods disclosed throughout the subject specification are capable of being stored on an article of manufacture to facilitate transporting and transferring such methodologies to computers for execution by a processor, and thus implementation of the example methodology, or for storage in a memory.

Figure 11:
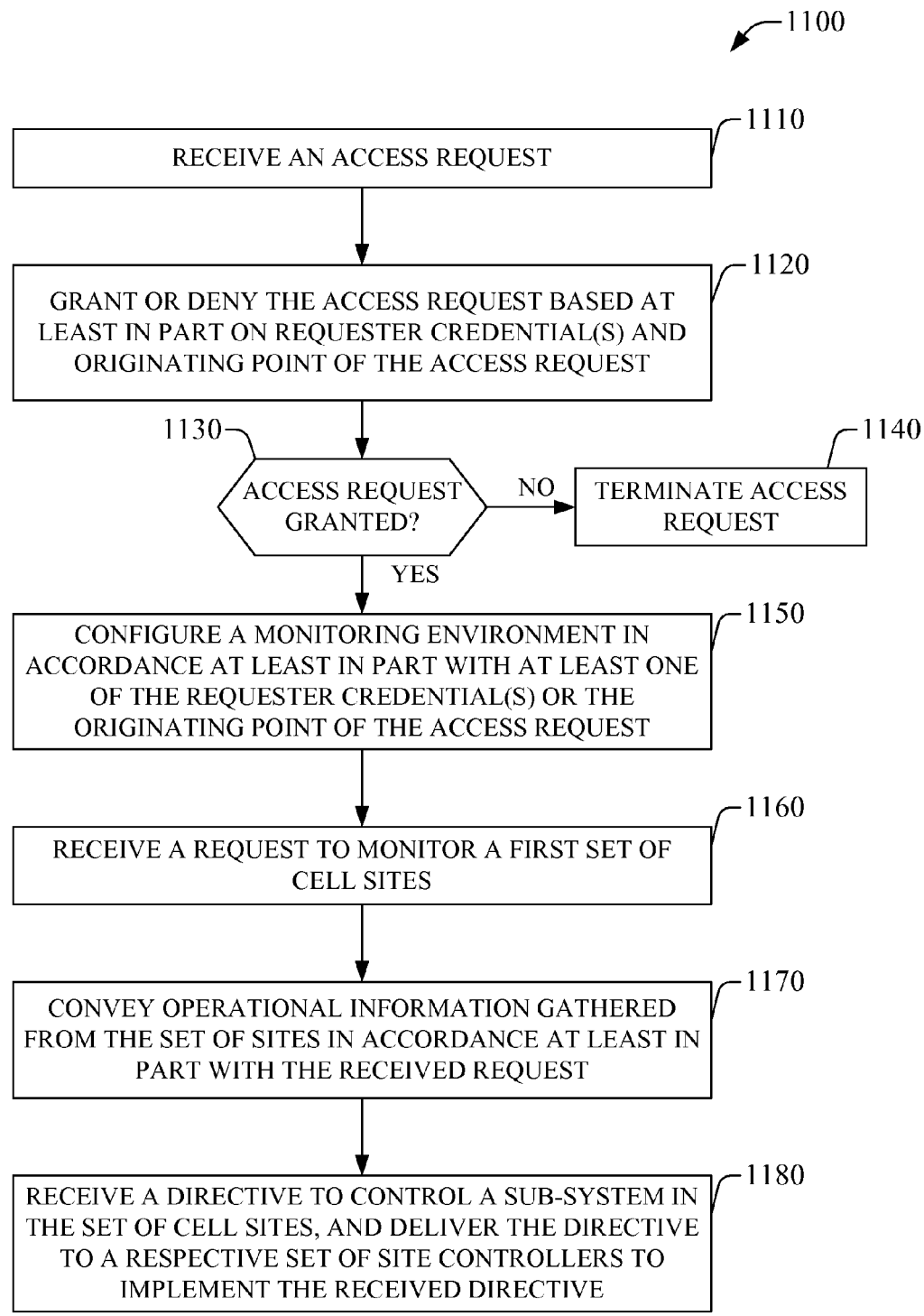
FIG. 11 is a flowchart of an example method for delivering cell site information according to aspects described in the subject specification.

FIG. 11 is a flowchart of an example method 1100 for delivering cell site information according to aspects described herein. The subject example method 1100 can be enacted by a management platform or server(s) that embody the management platform, or by one or more components that reside within the management platform or server(s). Alternatively or additionally, the subject example method 1100 can be enacted at least in part by a processor that resides within server(s) that embody management platform, or provide at least part of functionality of one or more components within the management platform. At act 1110, an access request is received. The access request can include specific cell site or portion thereof (e.g., sub-system) that is to be accessed. At act 1120, the access request is granted or denied based at least in part on requester credential(s) and originating point of the access request. At act 1130, it is evaluated whether the request was granted or denied. When a request is not granted, the access request is terminated at act 1140. In an aspect, termination of the access request can include communicating requester an error message, which can include details related to reason(s) the request was denied, e.g., credential(s) do not allow requester access to specific requested content or information, or point of access is invalid—an invalid point of access can be a terminal or other device that compromises security or data integrity. Termination of the access request also can include retaining (i) records of requester, (ii) point of access employed to place the access request, (iii) time-stamp for the access request, or the like. Conversely, when the access request is granted, at act 1150 a monitoring environment is configured in accordance at least in part with at least one of the requester credential(s) or the originating point of access. Monitoring environments can afford various levels of information, including data on one or more sub-systems in a single cell site, or data on a single sub-system in a set of cell sites in a specific deployment area. In addition, monitoring environments provide disparate interfaces to query, or request data from, sub-system(s) or cell sites, or to model data behavior.

At act 1160, a request to monitor a set of cell sites, or sites, is received; the set includes one or more cell sites. Such request typically is received through the configured monitoring environment. At act 1170, operational information gathered from the set of sites in accordance at least in part with the received request is conveyed. At act 1180, a directive to control a sub-system in a set of cell sites is received, and the directive is conveyed to a respective set of site controllers to implement the received directive. In an aspect, commands or directives are part of a script that can be generated and executed at least in part by one or more components that reside within a management platform, or server(s) that embody the management platform.

Figure 12:
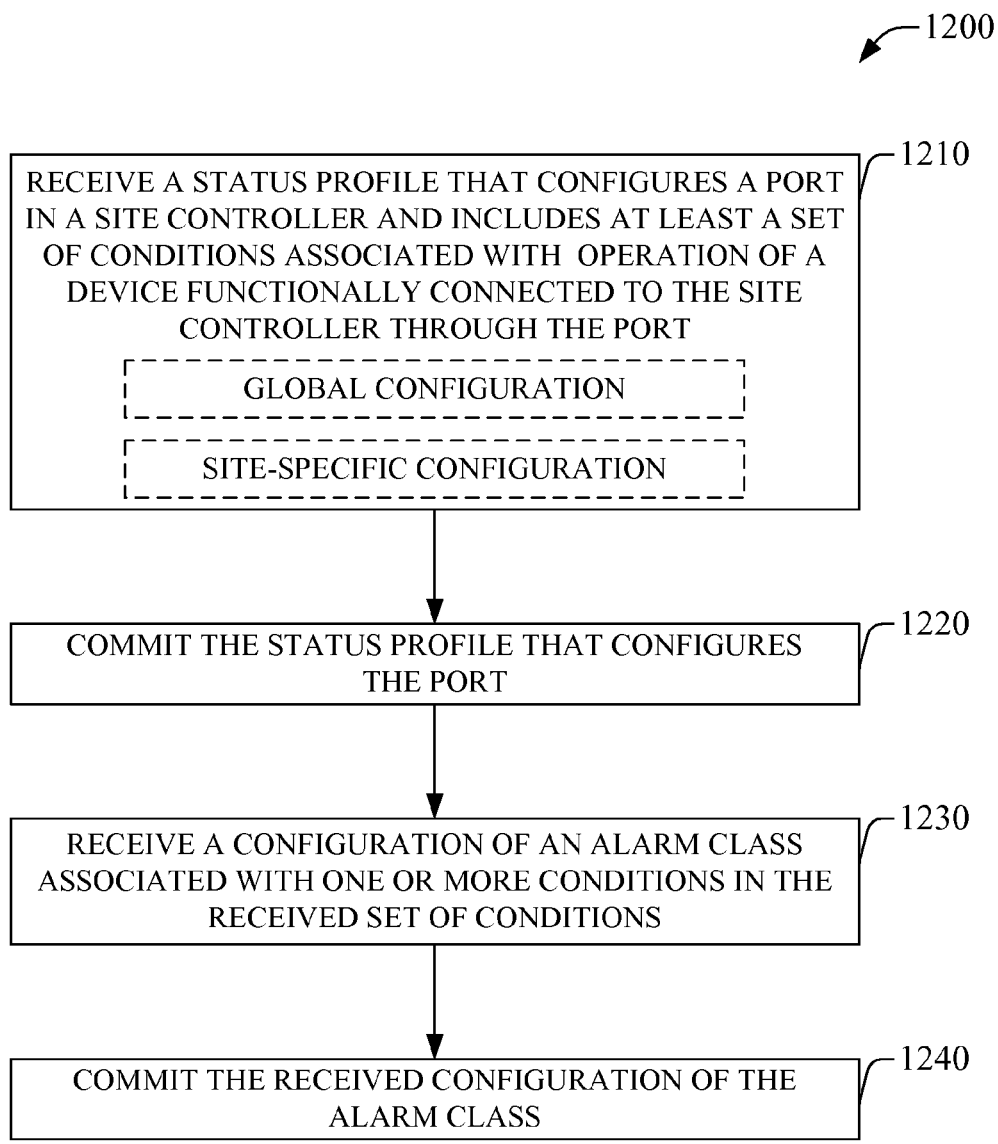
FIG. 12 is a flowchart of an example method for establishing a request to monitor one or more cell sites according to aspects described herein.

FIG. 12 is a flowchart of an example method 1200 for establishing a request to monitor one or more cell sites according to aspects described herein. The subject example method 1200 can be enacted at least in part by server(s), or by a component that resides within the server(s). Alternatively or additionally, the subject example method 1200 can be enacted at least in part by a processor that resides within server(s) that embody management platform, or provide at least part of functionality of one or more components within the management platform. At act 1210, a status profile that configures a port in a site controller and includes at least a set of conditions associated with operation of a device connected to the site controller through the port. The port has a specific logic address (e.g., an internet protocol (IP) address) and can be associated with a specific sub-system in a cell site, wherein the sub-system includes a set of devices that provide at least in part specific operational aspects of telecommunication through the cell site. Configuration can be global or site specific; global configuration associates the set of conditions in the status profile to each deployed port, whereas site-specific configuration establishes the set of operational conditions in a port in a selected site. In an aspect, the set of conditions can include one or more status conditions or polling conditions, as described above. At act 1220, the status profile that configures the port is committed. It is noted that such commitment includes delivery of the status profile to a site controller that includes the configured port.

At act 1230, a configuration of an alarm class associated with one or more conditions in the set of operational conditions is received. At act 1240, the received configuration of the alarm class is committed. It is noted that such commitment includes delivery of the status profile to a site controller that includes the configured port.

Figure 13:
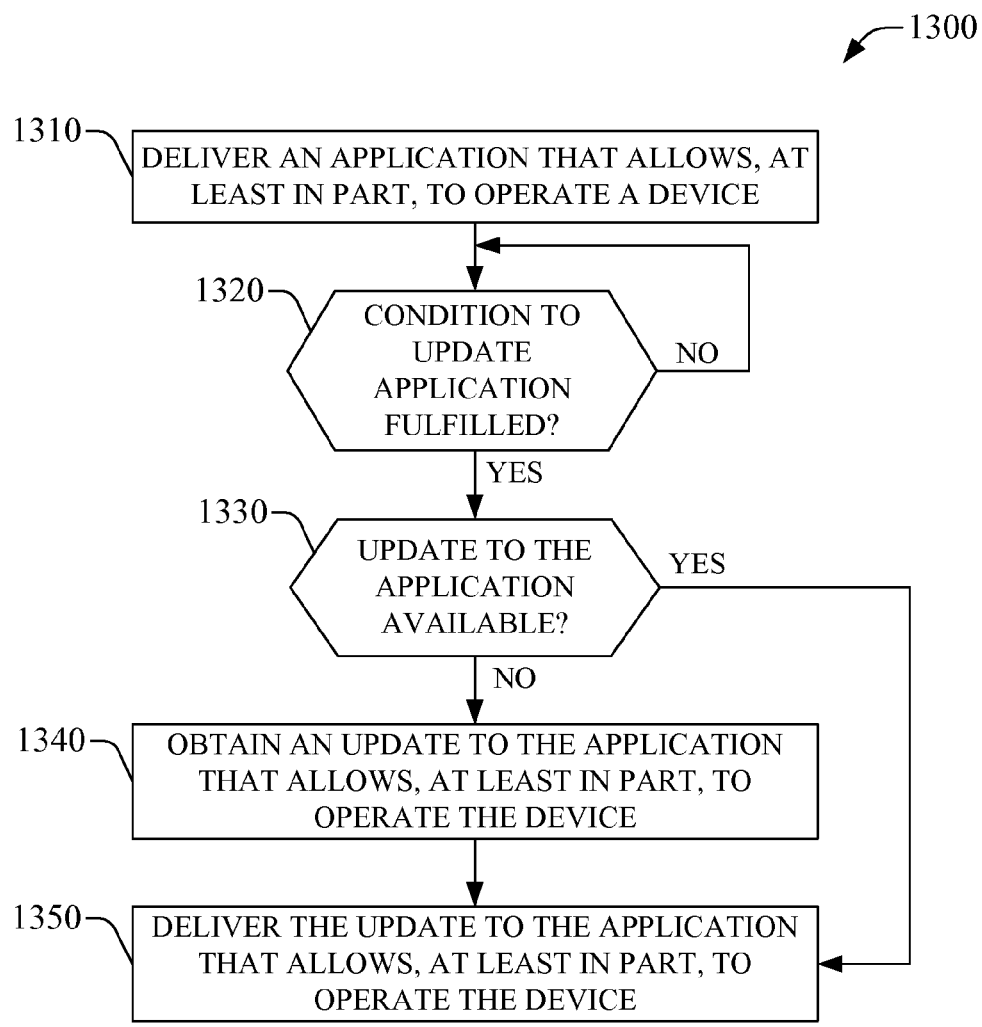
FIG. 13 is a flowchart of an example method for providing applications that enables, at least in part, operation of a peripheral device according to aspects described herein.

FIG. 13 is a flowchart of an example method 1300 for providing applications that enables, at least in part, operation of a peripheral device according to aspects described herein. The subject example method 1300 can be enacted at least in part by server(s), or by a component that resides within the server(s). Alternatively or additionally, the subject example method 1300 can be enacted at least in part by a processor that resides within server(s) that embody management platform, or provide at least part of functionality of one or more components within the management platform. It is noted that the operation of the peripheral device afforded through the application can be remote, e.g., control of the device, or local (e.g., operation according to a duty cycle) to the DSC; the peripheral device can be part of a sub-system functionally coupled to a dedicated site controller (e.g., site controller 810), can be. At act 1310, an application that allows, at least in part, to operate a device is delivered. Delivery can be implemented through link(s) 235, as a part of data 237. The application can be at least one of a collection of executable (e.g., compiled and linked) code instructions, compiled code instructions, source code instructions, libraries that support execution of code, templates, classes, or other objects; drivers such as those retained in memory element 829; or contents that implement one of augment, replace, or revise a management information base (MIB) within a SNMP, the MIB associated with management of the DSC and sub-systems thereof; or the like.

At act 1320, it is probed whether a condition to update an application is fulfilled; the application can a previously delivered application. Such a condition can be established as a part of at least one of a configuration protocol, a maintenance protocol, or operation protocol of a DSC or one or more sub-systems associated therewith. In the negative case, act 1320 is re-enacted. Such re-enactment can proceed according to a schedule (e.g., at a specific time of a day, a week, a month, a quarter, or a year) or in an asynchronous manner dictated, for example, by specific operation events in a remote location site. In the affirmative case, at act 1330, it is determined whether an update (e.g., a revised sub-system driver, an integrity or security patch . . . ) to the application is available. A negative outcome directs flow to act 1340 in which an update to the application that allows, at least in part, operation of the device is obtained. In an aspect, such an update can be requested from a vendor or manufacturer of the device. In another aspect, such an update can be commissioned to a third-party software developer or engineer, within or without the service provider that operates a management platform (e.g., platform 210). Conversely, a positive outcome to act 1320 leads to act 1350, in which an update to the application that allows, at least in part, to operate the device is delivered.

Figure 14:
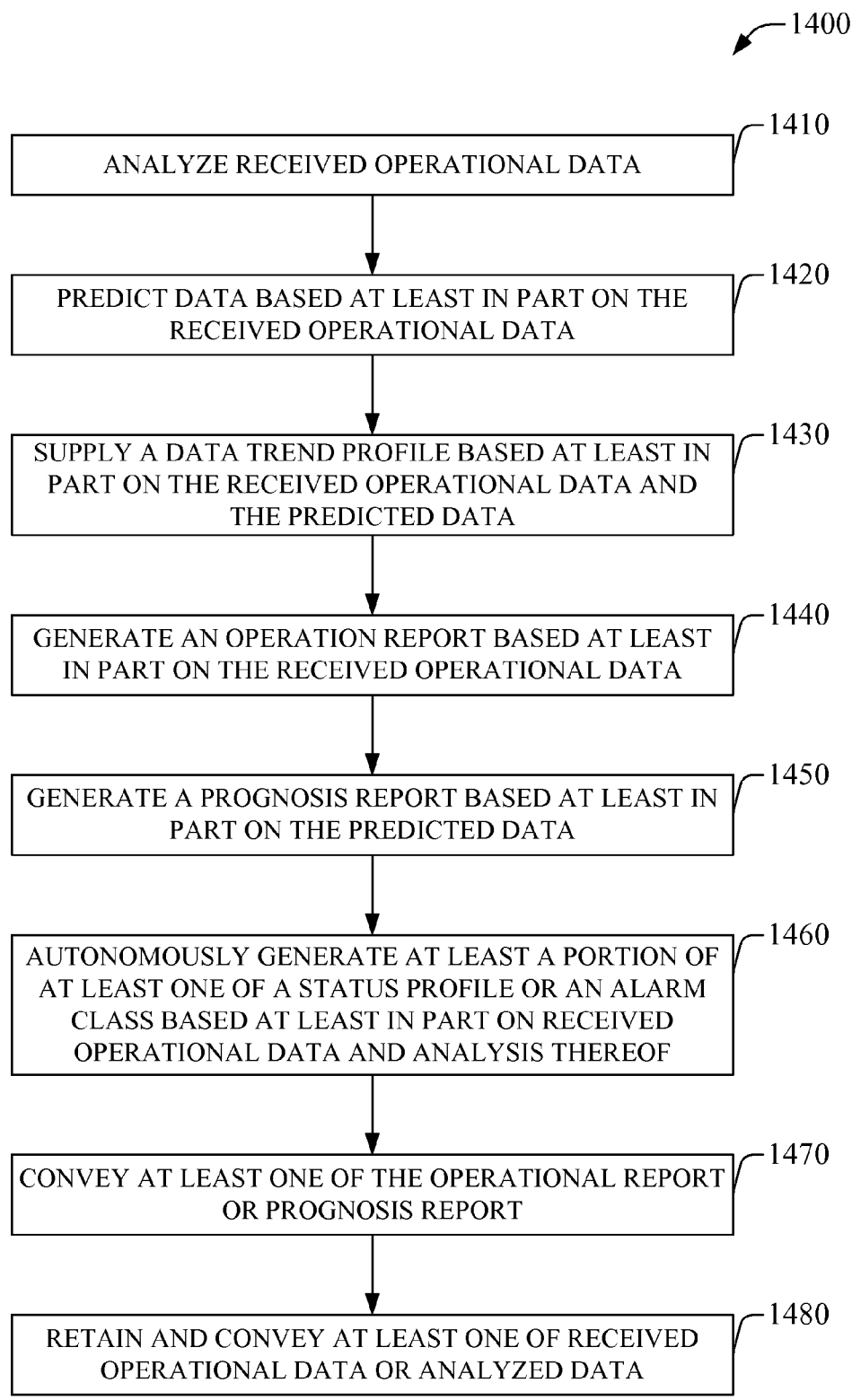
FIG. 14 presents a flowchart of an example method for reporting operational data collected from one or more cell sites according to aspects described herein.

FIG. 14 presents a flowchart of an example method 1400 for reporting operational data collected from one or more cell sites according to aspects described herein. The subject example method 1400 can be enacted at least in part by a management platform or a server(s) that embodies it, or by one or more components that reside within the management platform or server(s). Alternatively or additionally, the subject example method 1400 can be enacted at least in part by a processor that resides within the server(s) that embodies the management platform, or provides at least part of functionality of one or more components within the management platform.

At act 1410, received operational data is analyzed. Analysis can be directed to at least one of (i) status assessment through evaluation of the set of conditions established in a status profile; (ii) feature extraction of aggregated data; or (iii) trend generation or data modeling. Outcome(s) of the analysis can be retained in a memory (e.g., primary memory 240 or secondary memory 250). In an aspect, an analysis component that is part of the management platform can effect the subject act 1410. At act 1420, data is predicted based at least in part on the received operational data that is analyzed. In an aspect, analyzed data is employed to fit empirical, or semi-empirical, parameters to model operational data related to a specific sub-system, and thus predict data associated therewith through various simulation techniques such as Monte Carlo simulations or molecular dynamic simulations, or AI formalisms. At 1430, a data trend profile based at least in part on the received operational data and the predicted data is supplied. In an aspect, supplying a data trend profile includes creating the trend profile and delivering same. Creating a data trend profile can comprise collecting historical data retained in data storage for a predetermined period of time or a specific geographic area such as particular cell sites, and aggregating such data with predictions for time-dependent or space-dependent operational data.

At act 1440, an operation report is generated based at least in part on the received operation data. The operation report can comprise a performance ranking of a peripheral device with respect to other peripheral devices of the same type for which operational data is available. At act 1450, an operational prognosis report is generated based at least in part on the predicted data. As part of the operational prognosis report, peripheral devices for which data is available can be classified as "at risk" devices if predicted data reveals forthcoming operation outside predetermined alarm conditions such as performance tolerance intervals (e.g., laboratory benchmarks for device operation, field benchmarks generated during beta testing or other type of testing; regulated magnitude equipment output such as radiating power from a base station; standardized or custom-defined key performance indicators (KPIs); or the like).

At act 1460, at least a portion of at least one of a status profile or an alarm class is autonomously generated based at least in part on received operational data and analysis thereof. Autonomous generation can relay in AI techniques, such as at least those mentioned above, that can be implemented and exploited through the analysis component that can effect act 1410. At act 1470, at least one of the operation report or forecast report is conveyed. At act 1480, received operational data is retained and conveyed. Operation data can be retained in a database or data storage linked to a component (e.g., management component 205) that monitors or controls deployed cell sites. Received operational data can be conveyed to a disparate database or data storage.

Figure 15:
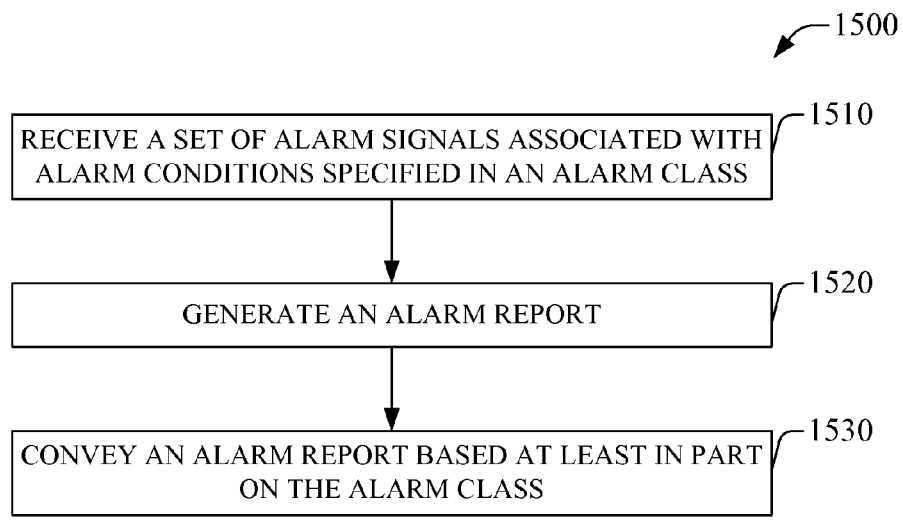
FIG. 15 is a flow chart of an example method for providing an alarm report according to aspects described herein.

FIG. 15 is a flow chart of an example method 1500 for providing an alarm report according to aspects described herein. The subject example method 1500 can be enacted at least in part by a management platform or a server(s) that embodies it, or by one or more components that reside within the management platform or server(s). Alternatively or additionally, the subject example method 1500 can be enacted at least in part by a processor that resides within the server(s) that embodies the management platform, or provides at least part of functionality of one or more components within the management platform. At act 1510 a set of alarm signals associated with alarm conditions specified in an alarm class is received. At act 1520, an alarm report is generated. In an aspect, generation of an alarm report can be at least one of low-level signaling that can be exploited by an apparatus or a display user interface to convey an alarm status, e.g., alarm true or alarm false. In addition, an alarm report (e.g., 736) can include a summary of an alarm event, the summary including source of the alarm such as a device; time stamp for the alarm; root cause, either hypothetical or verified; suggested course of action based at least in part of historical remedies provided for the alarm; or the like. At act 1530, the alarm report is conveyed in accordance at least in part with an alarm class, which can be retained in memory (see FIG. 5).

Figure 16:
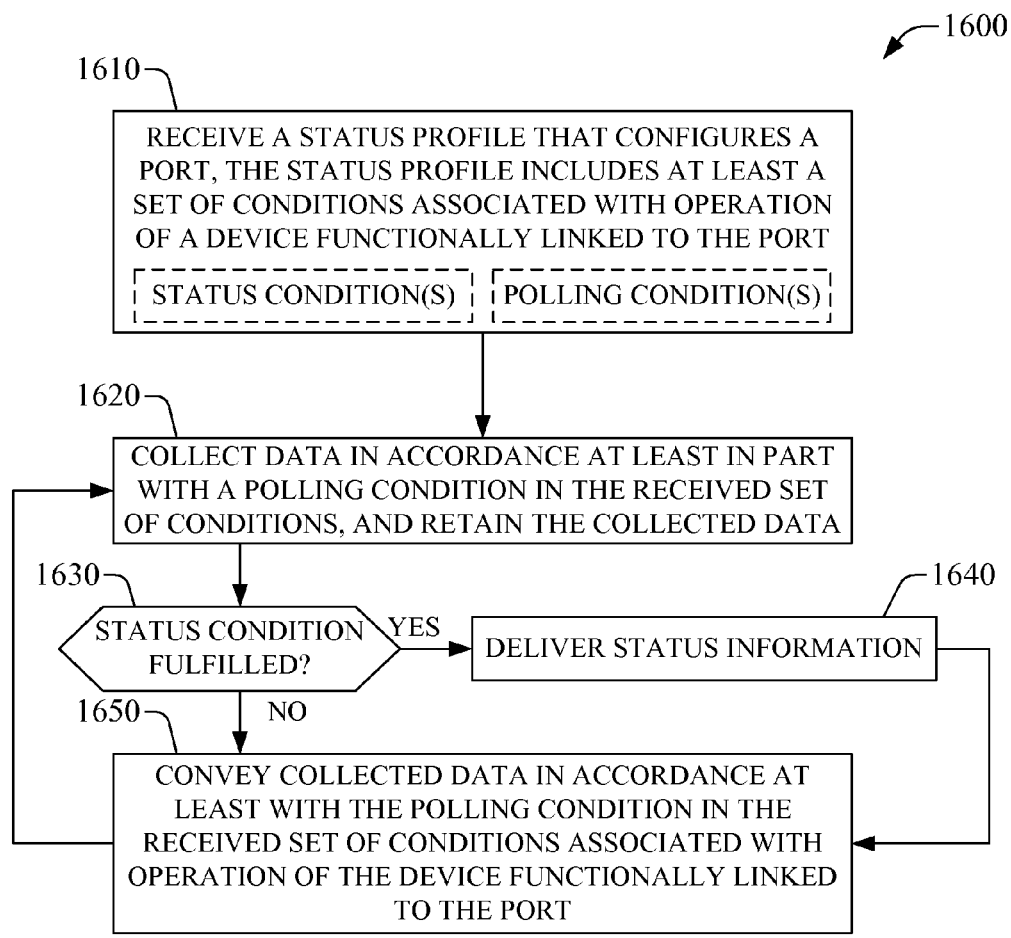
FIG. 16 is a flow chart of an example method for providing data and status conditions thereof according to aspects described herein.

FIG. 16 presents a flowchart of an example method 1600 for providing data and indication of status in a cell site according to aspects described herein. In an aspect, the subject example method 1600 can be enacted by a site controller (e.g., site controller 810) through a processor that provides at least part of functionality of a set of components within the site controller, wherein the set includes one or more components. To provide such functionality, the processor can execute at least one of one or more of the components in the set of components, or a set of code instructions retained in a memory. At act 1610, a status profile that configures a port is received, the status profile includes at least a set of conditions associated with operation of a device functionally linked to the configured port, wherein the configured port can reside within a system controller. The set of conditions can include one or more status conditions or polling conditions, as described above.

At act 1620, data is collected in accordance at least in part with a polling condition in the received set of conditions, and collected data is retained. Collected data can be retained in a cache that can be flushed at specific instances, or persisted in a long term memory (e.g., memory 826). At act 1630, it is determined whether a status condition is fulfilled. The determination can be made based at least in part on the collected data. In the negative case, flow is directed to act 1650. Conversely, when a status condition is fulfilled, status information is delivered at act 1640. In an aspect, information is delivered to a management platform (e.g., 210), or a server that embodies the management platform. In another aspect, status information can be delivered wireless to an authorized terminal that consumes data collected by the site controller that enacts the subject method 1600. At act 1650, collected data is conveyed in accordance at least in part with polling condition(s) in the set of conditions associated with operation of the device functionally linked to the port that is configured.

Figure 17:
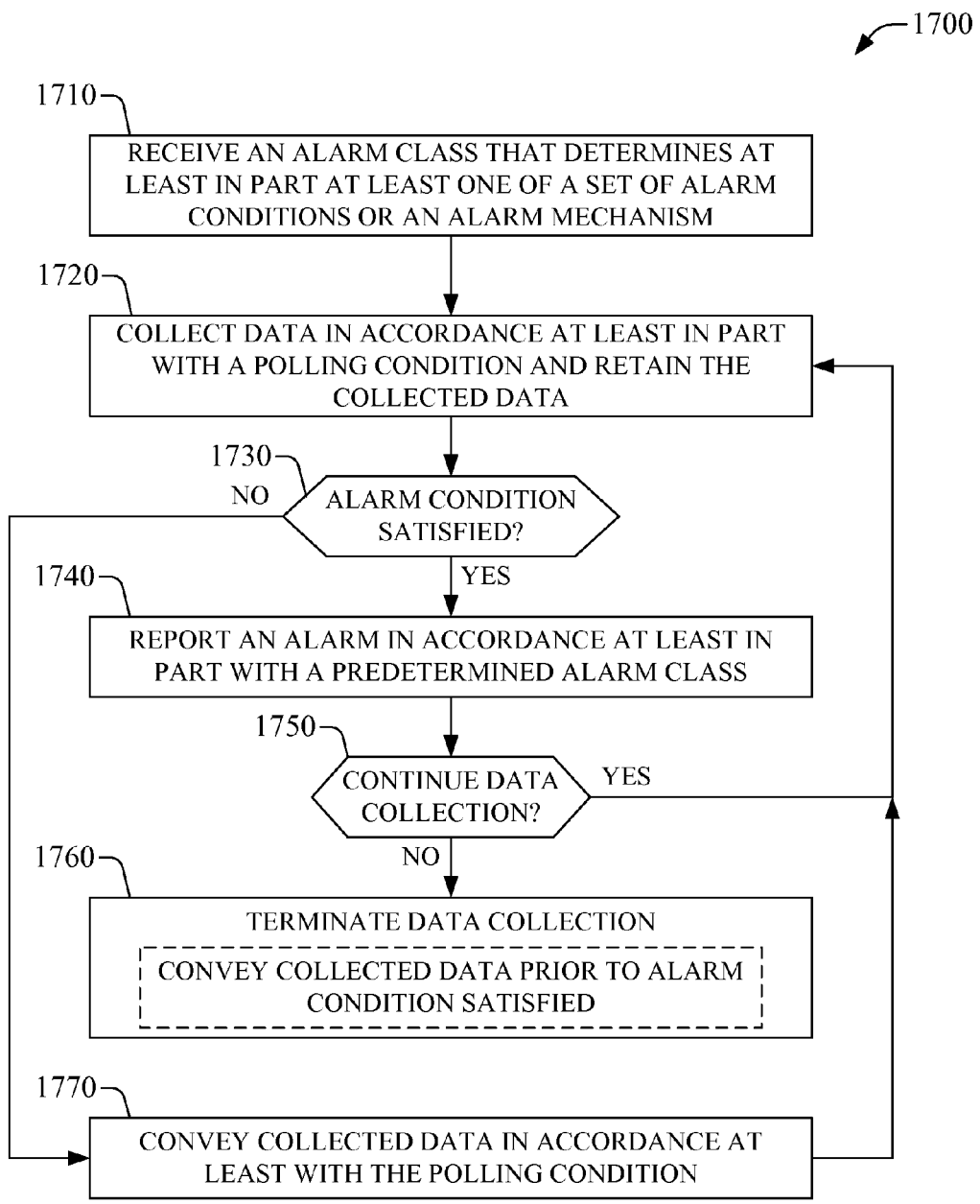
FIG. 17 presents a flowchart of an example method for generating an alarm indication in a cell site according to aspects described herein.

FIG. 17 presents a flowchart of an example method 1700 for generating an alarm indication in a cell site according to aspects described herein. In an aspect, the subject example method 1700 can be enacted by a site controller (e.g., site controller 810) through a processor that provides at least part of functionality of a set of components within the site controller, wherein the set includes one or more components. To provide such functionality, the processor can execute at least one of one or more of the components in the set of components, or a set of code instructions retained in a memory. At act 1710, an alarm class that determines at least in part at least one of a set of alarm conditions or an alarm mechanism is received. An alarm mechanism includes at least one of a set of multi-bit words, a graphical or audible token that can be conveyed in a user display interface, a short message service (SMS) communication, a multimedia message service (MMS) communication, an unstructured supplementary service data (USSD) message, an email message, an instant message, and so on. The received alarm class also can establish a set of one or more recipients for an alarm indication or alert. At act 1720, data is collected in accordance at least in part with a polling condition, and retained. The polling condition can be a part of a received set of conditions in a status profile. Data can be retained in a memory, such as data storage local to a site controller that effects the subject example method.

At act 1730, it is evaluated whether an alarm condition is satisfied. An alarm condition, in an aspect, can be defined as an SNMP trap. Negative outcome directs flow to act 1770. Otherwise, at act 1740, an alarm is reported in accordance at least in part with a predetermined alarm class. In an aspect, reporting an alarm includes generating an alarm indication and delivering the alarm indication, wherein the alarm indication can be an SNMP trap. Evaluation act 1750 probes whether data collection is to be continued. In the affirmative case, flow is directed to act 1720. Conversely, data collection is terminated at act 1760. Such termination can include, for example, delivery of a termination message, e.g., via control signal(s) 839, to one or more recipients as disclosed in an alarm class. As another example, data collection termination can convey visual or aural indicia in the site controller at a location of the configured port that no longer collects data from a device. Yet in another example, termination of data collection can include supplemental information (e.g., a time stamp, operation summary of devices in a sub-system that contains a device that generated alarm conditions . . . ) to a conveyed alarm report in act 1740. At act 1770, data is conveyed in accordance at least in part with the polling condition.

Figure 18:
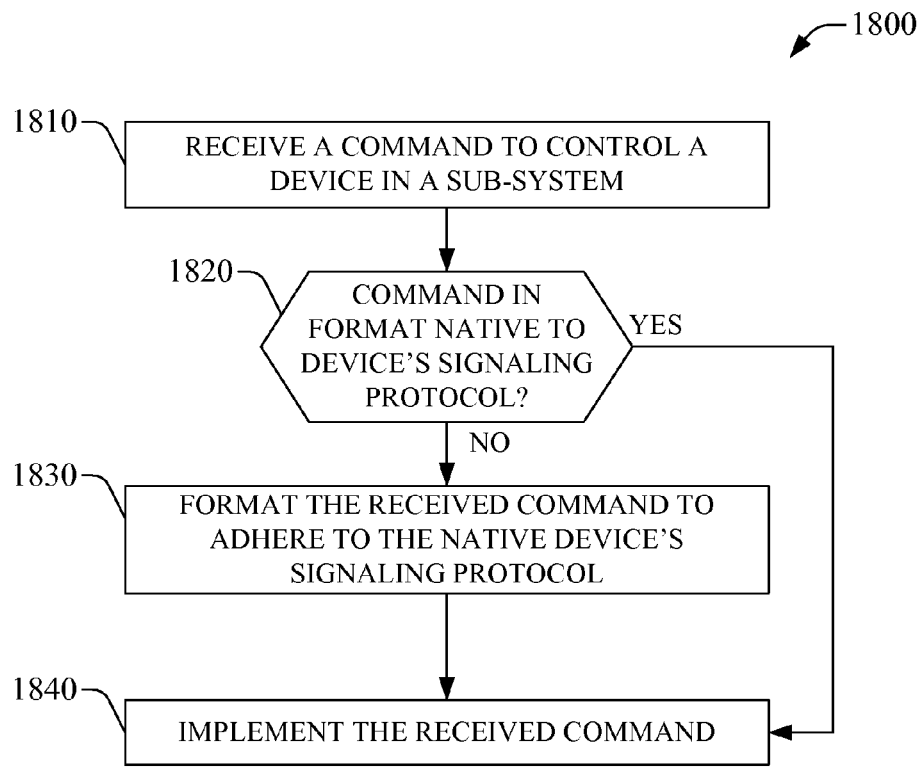
FIG. 18 is a flowchart of an example method for manipulating operation of a peripheral device in a cell site according to aspects described in the subject specification.

FIG. 18 is a flowchart of an example method 1800 for manipulating operation of a peripheral device in a cell site according to aspects described in the subject specification. In an aspect, the subject example method 1800 can be enacted by a site controller (e.g., site controller 810) through a processor that provides at least part of functionality of a set of components within the site controller, wherein the set includes one or more components. To provide such functionality, the processor can execute at least one of one or more of the components in the set of components, or a set of code instructions retained in a memory. At act 1810, a command to control a device in a sub-system associated with a site controller is received. The device can be functionally linked to a configured port in the site controller. At act 1820, it is determined whether the received command is in a format native, or compliant, with the device's signaling protocol. In the affirmative case, flow is directed to act 1840. Conversely, in the negative case, the command is formatted to adhere to the device's native signaling protocol at act 1830. At act 1840, the received command is implemented. In an aspect, a control component implements, at least in part, the command. Implementation includes execution of the command, wherein signaling is delivered to the device in order to adjust operational features, e.g., temperature setpoint in a thermostat, tilt of an RET antenna, etc.

Figure 19:
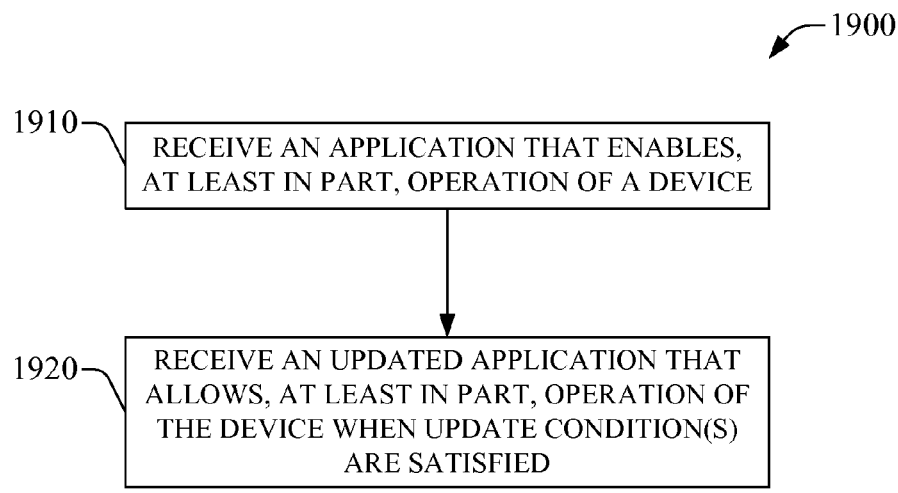
FIG. 19 is a flowchart of an example method for obtaining application(s) that enables, at least in part, operation of a peripheral device according to aspects described herein.

FIG. 19 is a flowchart of an example method 1900 for obtaining application(s) that enables, at least in part, operation of a peripheral device according to aspects described herein. In an aspect, the subject example method 1900 can be enacted by a site controller (e.g., site controller 810) through a processor that provides at least part of functionality of a set of components within the site controller, wherein the set includes one or more components. To provide such functionality, the processor can execute at least one of one or more of the components in the set of components, or a set of code instructions retained in a memory (e.g., memory 826). At act 1910, an application that enables, at least in part, operation of a device is received. In an aspect, as described supra, the application can be at least one of a collection of executable (e.g., compiled and linked) code instructions, compiled code instructions, source code instructions, libraries that support execution of code, templates, classes, or other objects; drivers such as those retained in memory element 829; or contents that at least one of augment, replace, or revise a management information base (MIB) within a SNMP, the MIB associated with management of the site controller and sub-systems thereof; or the like. At act 1920, an updated application that allows, at least in part, operation of the device is received when updated condition(s) are satisfied (see, e.g., FIG. 13 and description thereof.).

Figure 20:
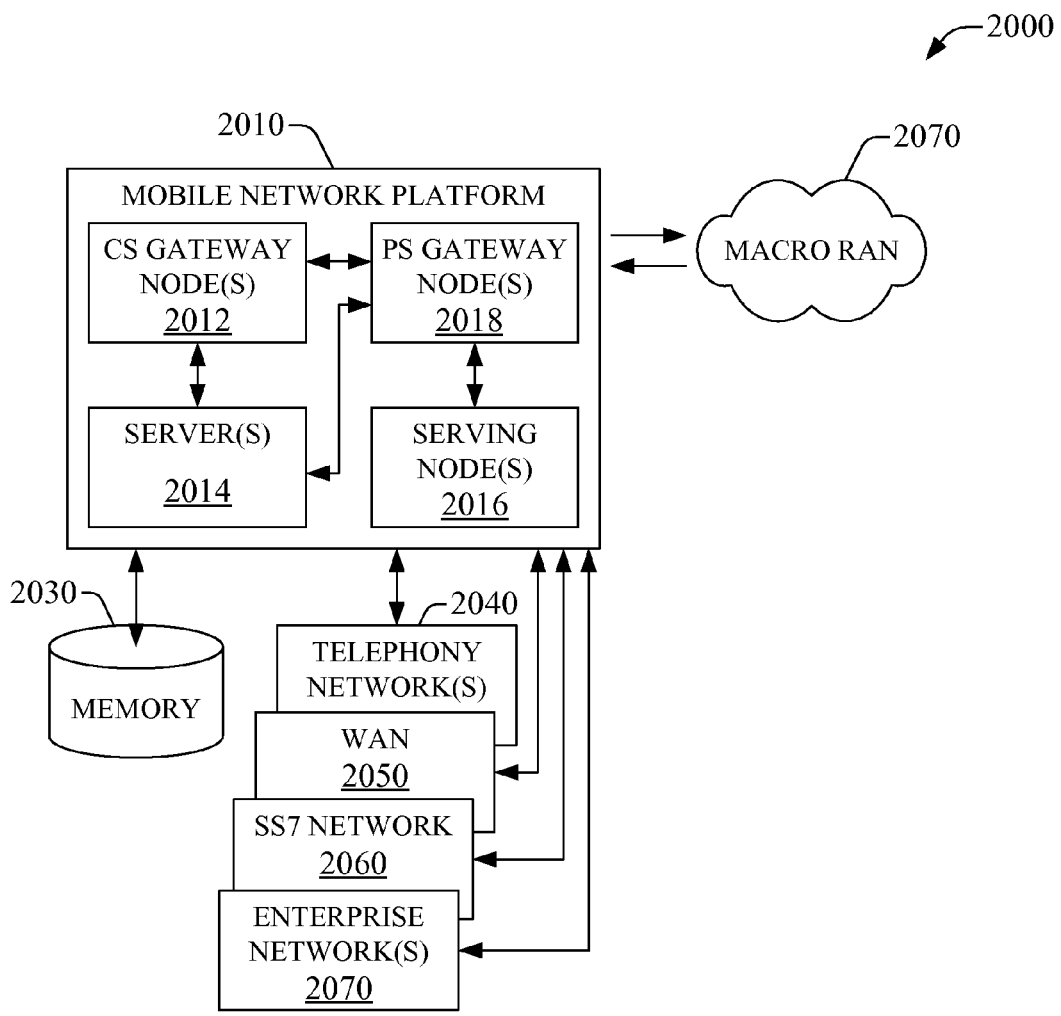
FIG. 20 illustrates an example wireless communication environment that can implement and exploit various aspects described in the subject specification.

To provide further context for various aspects of the subject specification, FIG. 20 illustrates an example wireless communication environment 2000 that can implement and exploit various aspects described in the subject specification. Wireless communication environment 2000 includes a mobile network platform 2010 that serves, or facilitates communication) with user equipment 2075 via a macro radio access network (RAN) 2070. It should be appreciated that in cellular wireless technologies (e.g., 3GPP UMTS, HSPA, 3GPP LTE, LTE-Advanced, 3GPP2 UMB . . . ), mobile network platform 2010 is embodied in a Core Network.

Generally, mobile network platform 2010 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, mobile network platform 2010 includes CS gateway node(s) 2012 which can interface CS traffic received from legacy networks like telephony network(s) 2040 (e.g., public switched telephone network (PSTN), or public land mobile network (PLMN)) or a SS7 network 2060. Circuit switched gateway 2012 can authorize and authenticate traffic (e.g., voice) arising from such networks. Additionally, CS gateway 2012 can access mobility, or roaming, data generated through SS7 network 2060; for instance, mobility data stored in a VLR, which can reside in memory 2030. Moreover, CS gateway node(s) 2012 interfaces CS-based traffic and signaling and gateway node(s) 2018. As an example, in a 3GPP UMTS network, gateway node(s) 218 can be embodied in gateway GPRS support node(s) (GGSN).

In addition to receiving and processing CS-switched traffic and signaling, gateway node(s) 2018 can authorize and authenticate PS-based data sessions with served (e.g., through macro RAN) wireless devices. Data sessions can include traffic exchange with networks external to the mobile network platform 2010, like wide area network(s) (WANs) 2050, enterprise network(s) 2070 (e.g., enhanced 911); it should be appreciated that local area network(s) (LANs) can also be interfaced with mobile network platform 2010 through gateway node(s) 2018. In an aspect, at least one of WAN 2050 or enterprise network(s) 2070 can provide access to server(s) 2014, which can embody a management platform that exploits a dedicated site controller (e.g., site controller 810) to monitor and control sub-systems of devices in a cell site or remote network location.

Gateway node(s) 2018 generates packet data contexts when a data session is established. To that end, in an aspect, gateway node(s) 2018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 2014. It is to be noted that in 3GPP UMTS network(s), gateway node(s) 2018 (e.g., GGSN) and tunnel interface (e.g., TTG) comprise a packet data gateway (PDG).

Mobile network platform 2010 also includes serving node(s) 2016 that convey the various packetized flows of information, or data streams, received through gateway node(s) 2018. As an example, in a 3GPP UMTS network, serving node(s) can be embodied in serving GPRS support node(s) (SGSN).

As indicated above, server(s) 2014 in mobile network platform 2010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by mobile network platform 2010. Data streams can be conveyed to gateway node(s) 2018 for authorization/authentication and initiation of a data session, and to serving node(s) 2016 for communication thereafter. Server(s) 2014 can also effect security (e.g., implement one or more firewalls) of mobile network platform 2010 to ensure network's operation and data integrity in addition to authorization and authentication procedures that CS gateway node(s) 2012 and gateway node(s) 2018 can enact. Moreover, server(s) 2014 can provision services from external network(s), e.g., WAN 2050, or Global Positioning System (GPS) network(s) (not shown). It is to be noted that server(s) 2014 can include one or more processor configured to confer at least in part the functionality of mobile network platform 2010. To that end, the one or more processor can execute code instructions stored in memory 2030, for example.

Server(s) 2014 can embody a management platform as described herein. In an aspect, one or more processors included within server(s) 2014 can confer at least part of the functionality of one or more components comprised in management platform 210. To that end, the one or more processor can execute code instructions stored in memory 2030, for example. Additionally or alternatively, server(s) 2014 can execute one or more components that are part of management platform 210 to attain at least in part the various functionalities of management platform 210.

In example wireless environment 2000, memory 2030 stores information related to operation of mobile network platform 2010. Information can include collected operational data from one or more sub-systems; predicted values of data, various algorithms for data modeling and simulation; status of one or more sets of peripheral devices associated with one or more sub-systems; alarm and status reports; status profiles and alarm classes; or the like. Information also can business data associated with service subscribers; market plans and strategies such as deployment of dedicated site controllers, advertisement campaigns for promotional services, business partnerships; operational data for mobile devices served through mobile network platform 2010; service and privacy policies; end-user service logs for law enforcement; and so forth. Memory 2030 can also store information from at least one of telephony network(s) 2040, WAN 2050, or SS7 network 2060.

Systems and methods described in the subject innovation provide at least three following three advantages over conventional systems and methods: (1) Improved network operation quality at reduced complexity. A plurality of peripheral devices that are part of a set of sub-systems associated with a cell site are monitored and remotely controlled according to configurable operation status conditions, and alarm conditions. Data and control signal(s) are delivered through a single link to a management platform, as opposed to several links as in conventional monitoring systems. (2) Reduced customer attrition accomplished by providing higher quality of service. (3) Better management of business resources and investment(s) accomplished through cost(s) reduction and improved service. With respect to network operations, rich data availability and monitoring configuration, in addition to configurable alarm conditions (i) mitigate multiple cell site visits by identifying equipment, or other resources, prior to first visit to the cell site in response to operational issue; (ii) reduce truck rolls through remote diagnosis and problem resolution, and identification of adequately skilled personnel for first dispatch based at least in part on accurate issue and root-cause analysis; and (iii) afford determination of common alarm classes at each site nationwide. In connection with RF engineering, rich data availability, data analysis, and monitoring configuration, in addition to configurable alarm conditions (a) allow remote downtilt adjustments, which improve quality of service faster and more economically; (b) reduce cell site visits to adjust tilts at cell sites with RET antenna(s); (c) obtain current information on RF chain components and cell site operational status; and (d) afford analysis of data trends and data forecast of RF chain components and other sub-subsystem in cell site, such analysis not currently in conventional system.

Aspects, features, or advantages of the subject innovation described herein can be exploited in substantially any wireless communication technology. For instance, Wi-Fi, WiMAX, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies; e.g., GSM.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
employing at least one processor of a cell site controller to facilitate execution of computer executable instructions retained in a memory of the cell site controller that, in response to execution, carry out operations comprising:
receiving a status profile that configures a port in the cell site controller, wherein the status profile includes a set of conditions associated with operation of a device functionally linked to the port;
employing the status profile to configure the port;
collecting operational data from the device in real-time with the site controller in accordance with a polling condition in the set of conditions;
arranging the collected operational data into a format suitable for streaming to an external management platform;
evaluating the collected or formatted operational data for data integrity;
streaming the collected or formatted operational data to the external management platform in real-time as a function of the polling condition in the set of conditions for performance of an evaluation of the collected or formatted operational data by the external management platform; and
receiving a command to update an application associated with the operation of the device based on the evaluation.

2. The method of claim 1, wherein the receiving the status profile includes receiving an alarm class that determines an alarm condition and an alarm mechanism for an alarm included in the alarm class; and
determining that the alarm condition is satisfied based on the data;
reporting the alarm in accordance with the alarm mechanism in response to the alarm condition being satisfied; and
terminating the collecting of the data in response to determining the alarm condition is satisfied.

3. The method of claim 2, wherein the reporting the alarm includes generating an alarm indication and delivering the alarm indication, wherein the alarm indication is a simple network management protocol trap.

4. The method of claim 1, wherein the cell site controller includes a plurality of ports that provide varied connections for disparate devices, and wherein the plurality of ports include a parallel port.

5. The method of claim 1, further comprising, receiving a command to manipulate operation of the device, and implementing the command.

6. A controller, comprising:
a port platform that includes a plurality of ports functionally linked to a plurality of devices in a cell site; and
a processor that executes the following computer executable components:
an interface component that receives a status profile and configures the plurality of ports based on the status profile; wherein the status profile includes a set of conditions associated with operation of the plurality of devices functionally linked to the plurality of ports;
a data collection component that collects operation data from the plurality of devices in real-time in accordance with a polling condition in the set of conditions and stores the operation data in a memory;
a format component that arranges the collected operation data into a format suitable for streaming to an external management platform;
an integrity component that evaluates the collected or formatted operation data for data integrity;
a component that streams the collected or formatted operation data to the external management platform in real-time in accordance with the status profile enabling the external management platform to perform an evaluation of the collected or formatted operation data; and
a component that receives a command to update an application associated with operation of at least one of the plurality of devices as a function of the evaluation.

7. The controller of claim 6, wherein the status profile includes an alarm class that determines an alarm condition and an alarm mechanism for an alarm included in the alarm class.

8. The controller of claim 7, further comprising a monitor component that determines that the alarm condition is satisfied based on the operation data and supplies an alarm indication to the external management platform in accordance with the alarm mechanism in response to satisfaction of the alarm condition, wherein the alarm indication is a simple network management protocol trap.

9. The controller of claim 6, further comprising, a control component that receives a command to manipulate operation of the plurality of devices from the external management platform, and implements the command.

10. The controller of claim 6, wherein the plurality of ports provide varied connections for devices employing disparate operative technologies, and include a parallel port.

11. The controller of claim 9, wherein the control component integrates a legacy controller through a local area network to implement the command.

12. A method comprising:
evaluating by a management platform, an access request based on requester credentials and an originating point of the access request; and
in response to granting the access request, the management platform carries out operations comprising:
receiving a request to monitor a remote network cell site, the remote network cell site includes a cell site controller and a set of devices connected to the cell site controller through a set of ports, wherein the receiving the request includes receiving a status profile that configures a port in the set of ports and includes a set of conditions associated with operation of a device in the set of devices connected to the port;
sending the status profile to the cell site controller to configure the port;
receiving operational information of the device in from the cell site controller in response to the sending;
storing and aggregating operational information received over time from the cell site controller;
analyzing the stored and aggregated operational information;
predicting a trend associated with the operation of the device based on the analyzing the stored and aggregated operational information;
analyzing the operational information to determine a current status of the device; and
directing a command to the cell site controller for update of an application associated with the operation of the device based on the current status of the device.

13. The method of claim 12, wherein the receiving the status profile includes receiving instructions to configure the port globally.

14. The method of claim 12, wherein the receiving the request to monitor the remote network cell site includes committing the status profile that configures the port.

15. The method of claim 12, wherein the receiving the request to monitor the remote network cell site further includes:
receiving a configuration of an alarm class associated with a condition in the set of conditions, wherein the alarm class specifies a recipient of a set of recipients of an alert and a mechanism to convey the alert; and
committing the configuration of the alarm class.

16. The method of claim 12, further comprising:
receiving a directive to control the device; and
delivering the directive to the cell site controller to implement the directive.

17. A system that manages a remote cell site, the system comprising a processor of a management platform that executes the following computer executable components retained in memory of the management platform:
an interface component that receives a status profile, wherein the status profile configures a port in a remote cell site controller and includes a set of conditions associated with operation of a device connected to the remote cell site controller through the port;
a component that delivers the status profile to the remote cell site controller to configure the port;
a component that receives operational data of the device from the remote cell site controller in accordance with polling conditions in the set of conditions in the status profile, in response to configuration of the port by the remote cell site controller;
an aggregation component that stores and aggregates operational data received over time from the remote cell site controller;
an analysis component that analyzes the stored and aggregated operational data received over time and predicts a trend associated with the operation of the device based on the analysis, and wherein the analysis component further analyzes operational data received from the remote cell site controller to determine a current status of the device; and
a component that directs a command to the remote cell site controller to enable update of an application associated with the operation of the device based on the current status of the device.

18. The system of claim 17, wherein the component that receives the operational data receives an alarm indication based on a configured alarm class that defines a set of alarm conditions.

19. The system of claim 17, further comprising:
a component that remotely controls the device through delivery of commands in a script to the remote cell site controller; and
a component that delivers the operational data to an authorized terminal.

* * * * *